US 8,413,070 B1

(12) United States Patent
Castrucci et al.

(10) Patent No.: US 8,413,070 B1
(45) Date of Patent: Apr. 2, 2013

(54) DECLARATIVE RESIZEABLE LIST IN ELECTRONIC FORM

(75) Inventors: Adam Castrucci, Ontario (CA); Tara Feener, St John's (CA)

(73) Assignee: Adobe Systems Incorporated, San Jose, CA (US)

( * ) Notice: Subject to any disclaimer, the term of this patent is extended or adjusted under 35 U.S.C. 154(b) by 1275 days.

(21) Appl. No.: 11/800,894

(22) Filed: May 7, 2007

(51) Int. Cl.
G06F 3/00 (2006.01)

(52) U.S. Cl. .......................... 715/788; 715/800; 715/830

(58) Field of Classification Search .................. 715/788, 715/800, 830
See application file for complete search history.

(56) References Cited

U.S. PATENT DOCUMENTS

| | | | | |
|---|---|---|---|---|
| 5,721,848 | A * | 2/1998 | Joseph ........................... | 715/764 |
| 7,406,663 | B2 * | 7/2008 | Treibach-Heck et al. .... | 715/788 |
| 2002/0194227 | A1 * | 12/2002 | Day et al. ....................... | 707/523 |

OTHER PUBLICATIONS

"Acroforms—A Quick Introduction to Acrobat Forms Technology", http://www.amgraf.com/PDFiles/Acroforms2.pdf, (Accessed Nov. 12, 2007),3 pgs.
"Adobe Dreamweaver", http://en.wikipedia.org/wiki/Dreamweaver, (Accessed Nov. 12, 2007),4 pgs.
"Adobe Flash", http://en.wikipedia.org/wiki/Macromedia_Flash, (Latest reflease Apr. 16, 2007),15 pgs.
"Class List", http://java.sun.com/j2se/1.5.0/docs/api/java/awt/List.html, (Accessed Nov. 12, 2007).
"Dynamically Growable Fields", http://uw713doc.caldera.com/en/SDK_charm/F_DynGrowableFields.html, Oct. 2002),3 pgs.
"HTML Editor", http://en.wikipedia.org/wiki/HTML_editor, HTML Editor begun in 1994 by Nicholas Longo and Kevin Jurica of CoffeeCup Software.,(Accessed Nov. 12, 2007),5 pgs.
"Listbox", http://en.wikipedia.org/wiki/Listbox, (Accessed Nov. 12, 2007),1 pg.
"MXML; introduced by Macromedia in Mar. 2004", http://en.wikipedia.org/wiki/MXML, (Accessed Nov. 12, 2007),2 pgs.
"Oracle Web-to-go—API Specification", http://www.fjqi.gov.cn/user/daim/hg2/OracleLite/Win32/Doc/Oldoc40/javadoc/wtg/oracle/html/package-summary.html, (Accessed Nov. 12, 2007), 5 pgs.
"XFA—XML Forms Architecture", http://en.wikipedia.org/wiki/XFA, Wikpedia, (Accessed Nov. 12, 2007),1 pg.
"XFA Template version 1.0", http://www.w3.org/1999/05/XFA/xfa-ternplate.html, (1999) 97 pgs.
Ditchendorf, Todd , "Expandable Widget Tutorial", http://www.ditchnet.org/wp/2007/02/10/expandable-widget-tutorial/, (Feb. 10, 2007),7 pgs.
McKenzie, Gavin , "XFA—XML Forms Architecture" submission, W3C.org, (Submitted May 1999; Accessed Nov. 12, 2007),3 pgs.
Wiger, Nathan , "Form Builder Release Notes", http://www.formbuilder.org/download/relnotes.pl?r=3.0202, Sun Microsystems, (2000-2005),6 pgs.

* cited by examiner

*Primary Examiner* — Michael Roswell
(74) *Attorney, Agent, or Firm* — Schwegman Lundberg Woessner P.A.

(57) ABSTRACT

Some embodiments may provide a method comprising accessing a list descriptor declaratively specifying a resizeability indication, selecting, responsively to the resizeability indication, a first linear size for a first list rendering, the first list rendering being based on the list descriptor, and generating the first list rendering based on the list descriptor and the first linear size.

36 Claims, 26 Drawing Sheets

Form Application

Favorite Star Viewing Locations — 104

Use this form to enter information about good locations for star viewing with dark skies away from city lights.

Name of site

Crown Mountain

Select State | Description, directions, etc. — 108

California
Colorado
214
112

This is an excellent location for star viewing. The entire sky is dark except for a small light dome in the northeast from Incuseville. To get there, take Hwy. 34 north from Gem City and take exit 7 toward — 106

102
103
104
110

Thank you for your input!
216

```
<descriptor type="list_box">
        <caption text="Select Model #" location="above"/>
        <size min_width="60" max_width=""
min_height="20" max_height="">
        <border>
        </border>
        <margins/>
        <font typeface="Times"/>
        <items>
                <text>T-300-RM</text>
                <text>T-300-RMX</text>
                <text>T-400</text>
                <text>T-600-XE</text>
        </items>
</descriptor>
```

FIG. 10

```
<descriptor type="list_box">
    <caption text="Select Model #" location="above"/>
    <size min_width="60" max_width=""
min_height="20" max_height="">
    <border>
    </border>
    <margins/>
    <font typeface="Times"/>
    <items>
        <text>T-400</text>
        <text>T-600-XE</text>
    </items>
    <event activity="ready" ref="$form">
        <script contentType="application/
x-javascript" runAt="both">
this.addItem("T-300-RM");
this.addItem("T-300-RMX");
        </script>
    </event>
</descriptor>
```

```xml
<descriptor type="button" name="Button1"
y="44.45mm" x="92.075mm" w="28.575mm"
h="6mm">
    <caption text="Select"/>
    <event activity="click">
        <script>
LB_1.addItem("T-300-RM");
LB_1.addItem("T-300-RMX");
        </script>
    </event>
</descriptor>
<descriptor type="list_box" name="LB_1">
    <caption text="Select Model #"
location="above"/>
    <size min_width="60" max_width=""
min_height="20" max_height="">
    <border>
    </border>
    <margins/>
    <font typeface="Times"/>
    <items>
        <text>T-400</text>
        <text>T-600-XE</text>
    </items>
</descriptor>
```

FIG. 12

```
<formtemplate>
    <descriptor type="list_box">
        <caption text="Select Model #" location="above"/>
        <size min_width="60" max_width="" min_height="20" max_height="">
        <border>
        </border>
        <margins/>
        <font typeface="Times"/>
        <items>
        </items>                                    1304
        <bindItems ref="$data.form1.list1[*]" labelRef="label" valueRef="token"/>    1306
    </descriptor>
    <templateDesigner FileName=".\bindItems.xml?"/>
</formtemplate>                                     1308
```
1302

FIG. 13

```
<form1>
    <list1>
        <label>T-300-RM</label>
        <token>t3</token>
    </list1>
    <list1>
        <label>T-300-RMX</label>
        <token>t3x</token>
    </list1>
    <list1>
        <label>T-400</label>
        <token>t4</token>
    </list1>
    <list1>
        <label>T-600-XE</label>
        <token>t6</token>
    </list1>
</form1>
```

*FIG. 14*

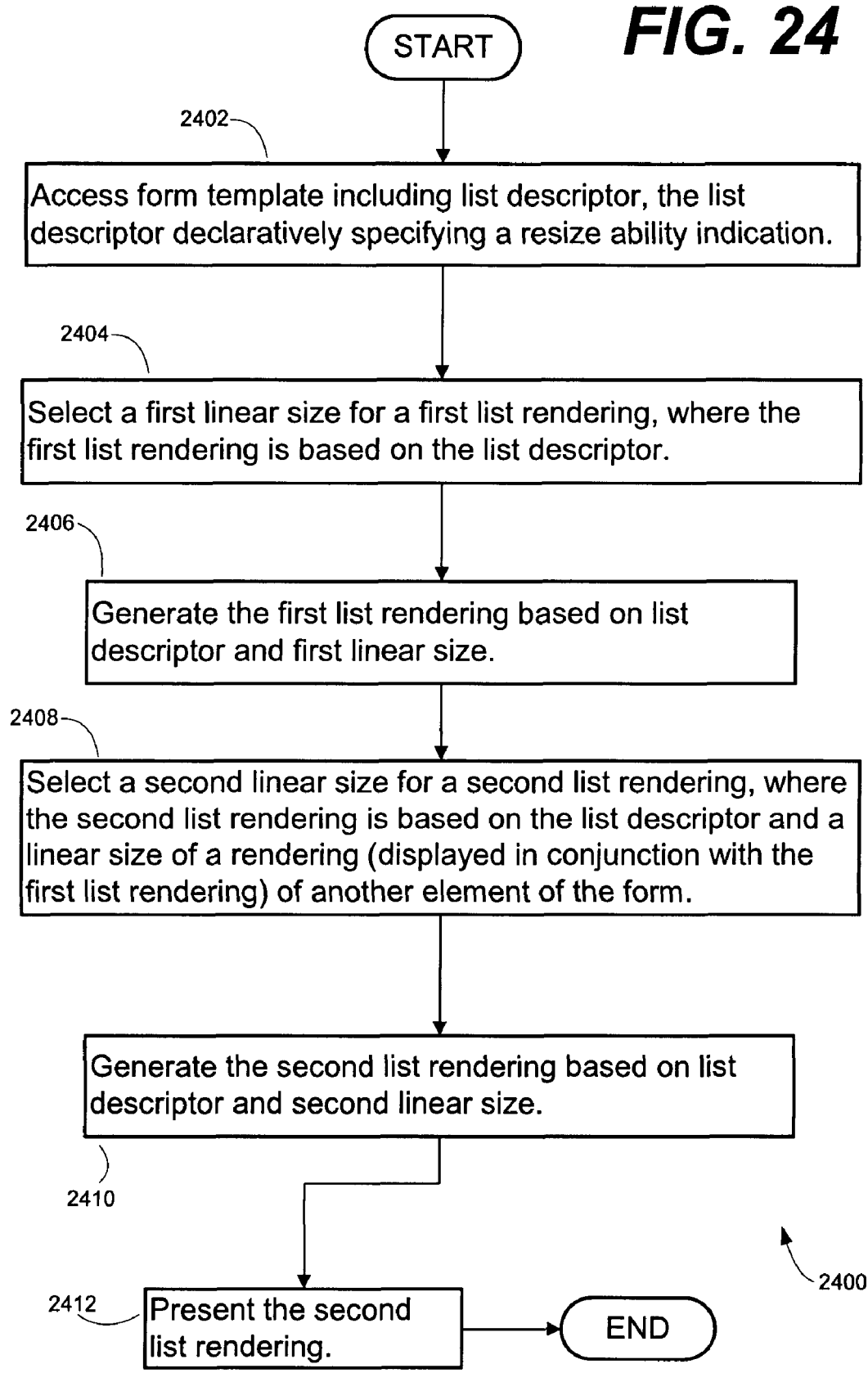

Form Application

Favorite Star Viewing Locations

Use this form to enter information about good locations for star viewing with dark skies away from city lights.

Name of site

Crown Mountain

Select State — 2504

- Arizona
- Arkansas
- California
- Colorado
- Idaho
- Illinois
- Indiana
- Iowa
- New York
- New Jersey Description, directions, etc.

This is an excellent location for star viewing. The entire sky is dark except for a small light dome in the northeast from Incuseville. To get there, take Hwy. 34 north from Gem City and take exit 7 toward — 2506

Thank you for your input!

DECLARATIVE RESIZEABLE LIST IN ELECTRONIC FORM

FIELD

Embodiments relate to management of electronic content and more specifically to a method and system to enable declaratively-specified resizable lists.

BACKGROUND

In many fields of endeavour, it is necessary for electronic forms, sometimes embedded within other electronic content, such as web pages or electronic document, to be presented to a user. These electronic forms are typically presented as a graphical user interface (GUI) and users may use one or more user input devices to fill in the forms.

Electronic forms may include a number of different types of fields, depending on the nature of the information to be gathered from a user. Typical examples include single-line text fields (in which a user positions a cursor or other indication within a rendering of a rectangular region and types a single line of text, which appears in the rendering and may be subsequently transmitted or stored in association with an identifier of the text field), multi-line text entry boxes for entering larger texts, various binary inputs (such as check boxes adjacent to various semantically relevant labels), and selectable lists of items. Such lists may comprise a rectangular box capable of showing a single list entry. By clicking on a button typically located in conjunction with the box, a larger box is rendered showing a number of selectable items. This larger box sometimes appears below the original box and thus such selectable lists have come to be known as "drop-down lists." Once the user has selected an item (e.g. which may include but is not limited to clicking on its text with a mouse or other device), the larger box disappears and the selected item is shown in the rectangular box. Some other lists (sometimes called scrolling lists) may be in the form of a rectangular field capable of showing several list entries at once, possibly with a scroll bar or other affordance to permit a user to view various list items where the number of list items is larger than the number than can be accommodated within the rectangle rendered on a display device.

Electronic forms may be described in files that include data that may be termed a form template. Such a form template may include information about describing the electronic form, including information about the various form elements to be displayed, their labels, their sizes, and the spatial relationship of the elements to be displayed. Such form templates may also include data used to pre-populate the rendering of the form (for example, the list of items to be displayed in a list) or executable instructions (sometimes called "scripts") for retrieving items (e.g. short text strings) from a data store, in which the retrieved items are included in the rendering of a form element. For example, a form template may specify that a scrolling list is to be rendered, and may include a list of text labels to be shown as the GUI selectable items within the list rendering.

BRIEF DESCRIPTION OF DRAWINGS

Some embodiments are illustrated by way of example and not limitation in the figures of the accompanying drawings in which:

FIG. 2 illustrates a re-rendering of the user interface window of FIG. 1 in response to user manipulation of rendering of the electronic form via a graphical user interface, according to an example embodiment.

FIG. 10 illustrates an example data list descriptor that may be represented in an XML document representing a form template, according to an example embodiment.

FIG. 11 illustrates a list descriptor in which additional list items to be rendered in the list rendering are added by a script, according to an example embodiment.

FIG. 12 illustrates a list descriptor in which a set of list elements is modified by a script in response to a user interaction with a graphical user interface item, according to an example embodiment.

FIGS. 13 and 14 illustrate an example of a list descriptor to which list elements are associated or bound via retrieval from a secondary data store, according to an example embodiment.

FIG. 24 is a flowchart illustrating a process including generating a first list rendering based on a list descriptor, generating a second list rendering based on another form element rendering having a different linear size or sizes is compared to the first list rendering, and presenting the second list rendering, according to an example embodiment.

FIG. 25 illustrates an example user interface including a list rendering based on a list descriptor declaratively specifying the resizeability indication, according to example embodiment.

DETAILED DESCRIPTION

Figure 1:
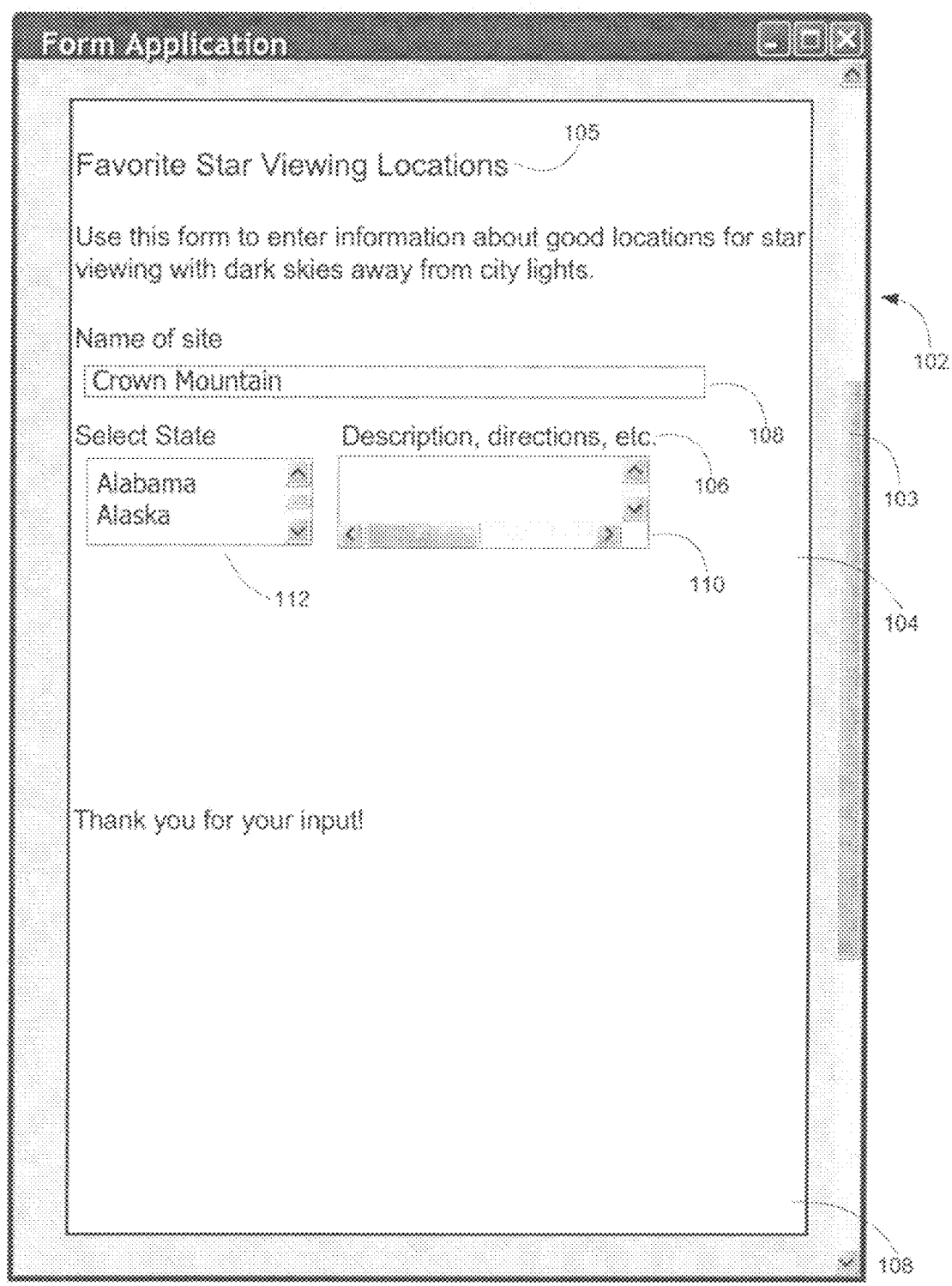
FIG. 1 is an illustration of a rendering of an electronic form as may be presented by a form application within a graphical user interface, according to an example embodiment.

In the following description, for purposes of explanation, numerous specific details are set forth in order to provide a thorough understanding of some example embodiments. It will be evident, however, to one skilled in the art that the present invention may be practiced in other embodiments without these specific details.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Introduction

Within an electronic form, various form elements may be arranged with respect to one another and/or may be visually grouped according to descriptions in the form template. In some embodiments, an electronic form may be resized, e.g., by redrawing its rendering as a whole at a larger or smaller size than it was originally rendered. In doing so, various elements of the form may be redrawn at a different size than originally. The renderings of various elements of a form may also change size in response to user actions. For example, a multi-line text entry box may be re-rendered to expand in size as a user enters increasing amounts of text into the rendering of the text entry box.

In some embodiments, a scrolling list or drop-down list may be sized or resized to present a pleasing appearance. For example, if a scrolling list is shown adjacent to a text box, both may initially be rendered in a small size. But as a user enters an increasing amount of text into the text box and the text box is re-rendered in response to take up more area on a display device, the adjacent scrolling list may be re-rendered so as to be of a similar size as the text box so that the overall form maintains a visually pleasing balanced appearance even as the rendering of the text entry box increases in size in response to the entry of text by the user. Similarly, in some embodiments a scrolling list or drop-down list may be re-rendered in response to user actions and entries in the electronic form. For example, if a scrolling list originally containing only a few items, the scrolling list may be re-rendered with additional items in response to other user actions on the form GUI, such as for example the selection of a check box.

Such scrolling list re-rendering may be accomplished by providing specialized scripts or other programmed instructions within form templates or in associated program code. Such scripts or other programmed instructions, however, are beyond the skill of many persons who may wish to create electronic forms. In some cases, such programmed instructions would need to manipulate the data structures used by software managing and rendering the electronic form. In addition, because a single form template may be rendered and used by various application software programs, it may be necessary to program several sets of instructions, each set being specialized to the data structures of a particular application programs. In addition, some such application programs may not support such programmed instructions at all, defeating the form designer's ability to provide scrolling lists whose size can change over time.

For the purposes of this specification, the term "electronic content" shall be taken to include any digital data that may be presented to a consumer (e.g., visually or audibly presented) and may include electronic document, page-descriptive electronic content such as a page-descriptive electronic document, media stream, web page, hypertext document, image, digital video, digital audio, an animation, merely for example. A "content element" shall include any part or share of electronic content that is defined or discernable as a part or share. For example, a content element may be automatically discerned from a characteristic of the content element itself (e.g., a paragraph of an electronic document) or may be manually defined by a user (e.g., a user-selected collection of words in an electronic document, a user-selected portion of a digital image). Examples of content elements include portions of a page-descriptive document or other electronic document, such as, for example, pieces of electronic text or other material within the electronic document, portions of media streams such as sections of digital video or frames or sets of frames of digital video or digital audio, segments or frames of animations, electronic forms, form templates, form elements, form data, and various elements presentable or accessible by users within electronic content, and the like. Content elements may include empty content, for example an electronic document may include a blank page; the content of the blank page, namely any data indicating its blankness, may in some embodiments be considered as a content element, namely an empty content element. Content elements may include format data such as, for example, position information describing the placement of other content element(s), or information specifying colors or fonts to be used in rendering other content element(s).

For the purposes of this specification, the term "electronic content presentation application" may be taken to include systems, applications, and mechanisms for presenting electronic content, including the presentation of content elements such as text, graphics, video, audio, form element renderings and other electronic content elements. For the purposes of this specification, the term "form application" may be taken to include electronic content presentation applications capable of presenting renderings of electronic forms and/or receiving via user input, data to be associated to, and/or stored or transmitted in association with form elements.

For the purposes of this specification, a content item may be "associated" with electronic content. Examples of such association include inclusion within a file or other data structure containing the electronic content, the presence of a direct or indirect reference to the content element within electronic content, or the presence of a data structure, file, or other mechanism by which a content element is associated with electronic content. The association of a content element with electronic content does not necessarily require that when the electronic content is presented (or otherwise made accessible to a user or as input to a machine), that the content element is, in the course of presentation or access, also presented or made accessible.

In considering the association between electronic content and an associated content element, the term "literally included" may be used. In this specification, electronic content may, for example, literally include a content item if the data structure that contains the data that largely describes the electronic content includes the data that largely describe the content element. In some embodiments, a content element may be associated with electronic by reference, wherein the data that describes the content element is not directly contained within or integral with the data that describes the electronic content with which the element is associated.

For the purposes of this specification, the term "rendering" used as a verb includes presenting or making accessible electronic content or content elements to be perceived, viewed, or otherwise experienced by a user, or be made available for further processing, such as, for example, searching, digesting, printing, analyzing, distilling, or transforming by computational processes that may not include processing the intrinsic data structure describing the electronic content or content element. Whether a content element associated with an electronic content is included in the rendering of the electronic content may, by default, be determined by whether or not the content element is active.

For the purposes of this specification, the term "rendering" used as a noun includes human-perceivable representations of data that is within a machine and perception-specialized organizations of data defining such representations. For example, a rendering may include a pattern of human-perceivable matter or energy presented on an output device by a machine, as well as the organization of data within a machine specialized to define such patterns. For example, such organizations of data may include the electronic configuration of a memory used by a graphics display processor, or a file containing an audio segment suitable for playing via an audio system of a computer.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or computational object to achieve a particular function, operation, processing, or procedure.

For the purposes of this specification, the term "resizeability indication" may be taken to include any data item, object, flag, bit, string, attribute, or other information processing artifact indicative that a rendering of the data object to which the indication pertains may be resized, and once resized, re-rendered, wherein the factors upon which the resizing is based are context-sensitive. Such context-sensitivity may include sensitivity to the number and rendering size of list elements to be displayed within a rendering of the data object (e.g., list box) and sensitivity to the geometry, configuration, and conformation of renderings presented in conjunction with a rendering of the data object, such as adjacent for element renderings or electronic content.

For the purposes of this specification, the term "form template" may be taken to include any file, data structure, or other electronic artifact specifying a collection of descriptions of user interface affordances that may be presented in conjunction with one another so as to elicit user input. In some embodiments, the entry of data via a graphical user interface with respect to a rendering of a particular form element may be used to associate a token representing that form element with the data entered via the graphical user interface, with the data and token being associated for further processing, storage, or transmission.

For the purposes of this specification, the term "list descriptor" may be taken to include a file, data structure, or other electronically stored representation that when processed by a form application or other process may provide instructions or descriptive information, or include, reference, or comprise instructions or descriptive information at least partially utilizable for composing and/or presenting a rendering of a scrolling, drop-down, or other list upon an output device and/or within a graphical user interface.

It will be appreciated that in some embodiments, when a list descriptor is literally included within a form template, which is in turn literally included within electronic content, the list descriptor may be considered to be literally included within the electronic content.

For the purposes of this specification, the term "declarative" may include specifying that an affordance or rendering described by a particular data structure may have a particular characteristic without specifying how that characteristic is to be brought about in the rendering or development of the resulting data from the data object.

For the purposes of this specification, the term "linear size" shall be taken to include the length along one or more dimensions of a rendering of a data object as presented on an output device.

For the purposes of this specification, the term "list element" shall be taken to include an element of data whose graphical representation may be presented within a rendering of a list, in which the list may be described, for example, by a list data object and/or based on a list descriptor. For the purposes of this specification, the term "list element rendering" may include a rendering of a list element.

For purposes of this specification, the term "form element" shall be taken to include a component of an electronic form and the term "list form element" shall be taken to include a component of an electronic form to be presented as a list graphic, such as a scrolling list or drop-down list.

A number of technical problems exist with respect to resizable lists in electronic forms. For example, when the sizing/resizing of lists in electronic forms is automatically handled by a form presentation application in response to the presence of a resizeability indication, execution speeds and memory access efficiency may be higher than when the sizing/resizing is handled via a script written by an electronic content author. Another example technical benefit may include more efficient memory usage. In some embodiments, the ability to load a subset of list elements into a list representation in response to a user action, as needed, rather than loading the larger set of list elements when the list representation is first rendered may provide more efficient memory use.

Example Graphical User Interfaces Representing Electronic Forms

FIG. 1 is an illustration of a rendering of an electronic form as may be presented by a form application within a graphical user interface, according to an example embodiment.

FIG. 1 illustrates an example graphical user interface (GUI) window 102 as it may be presented or rendered on a display screen or other output device. The user interface window 102 may be presented by a form application, such as for example an application for displaying electronic documents, extensible mark-up language (XML) documents, hypertext mark-up language (HTTP) documents, XML Forms Architecture (XFA) documents, page-descriptive electronic documents, or other forms of electronic content. In the example user interface window 102, an electronic document including an electronic form template is illustrated as it may be rendered by a form application. The rendering may include an electronic document page 104. A scroll bar 103 may be provided to permit a user to scroll through the electronic content when the electronic content, when rendered, comprises more than a single screen of output.

The electronic document rendered as the page 104 may include several components, for example, a text 105 and a rendering of the form template. The form template may include a number of form elements, such as for example form elements describing a single line text entry field descriptor which may be rendered as a text entry box 108, a text entry box descriptor which may be rendered as a text entry area 110 and its associated caption 106, and a scrolling list descriptor which may be presented in the graphical user interface window 102 as a list rendering 112.

When the user interface window 102 is presented to a user, the form application may permit the user to enter or select or otherwise manipulate the rendering of the electronic form. For example, by entering data via an input device into the text entry box 108 and/or the text entry area 110, or by selecting (for example, by clicking upon) one or more entries within the scrolling list rendering 112.

FIG. 2 illustrates a re-rendering of the user interface window 102 of FIG. 1 in response to user manipulation of rendering of the electronic form via a graphical user interface, according to an example embodiment.

With reference to FIG. 2 it will be appreciated (by comparison with user interface window 102 of FIG. 1) that a user has entered an amount of text into the text entry area 110 and in response the text entry area 110 has been re-rendered so as to have a larger linear size, in the example illustration of FIG. 2, in the vertical dimension. As a result, the page 104 of the electronic document has been re-rendered so that the text line 216 is illustrated as being located further down the page so as to remain in the same position relative to the lower edge of the text entry area 110.

In addition to illustrating text entered by a user into a text entry area 110, the user interface window 102 also illustrates (e.g., via a bold text attribute) that a list element rendering 214 has been selected within the list rendering 112. The list rendering 112, however, has not been re-rendered with a different linear size as a result of the various user input actions received by the form application. This lack of re-rendering may be due to a lack of a resizeability declaratively specified for a list descriptor from which the list rendering 112 is produced by the form application.

Figure 3:
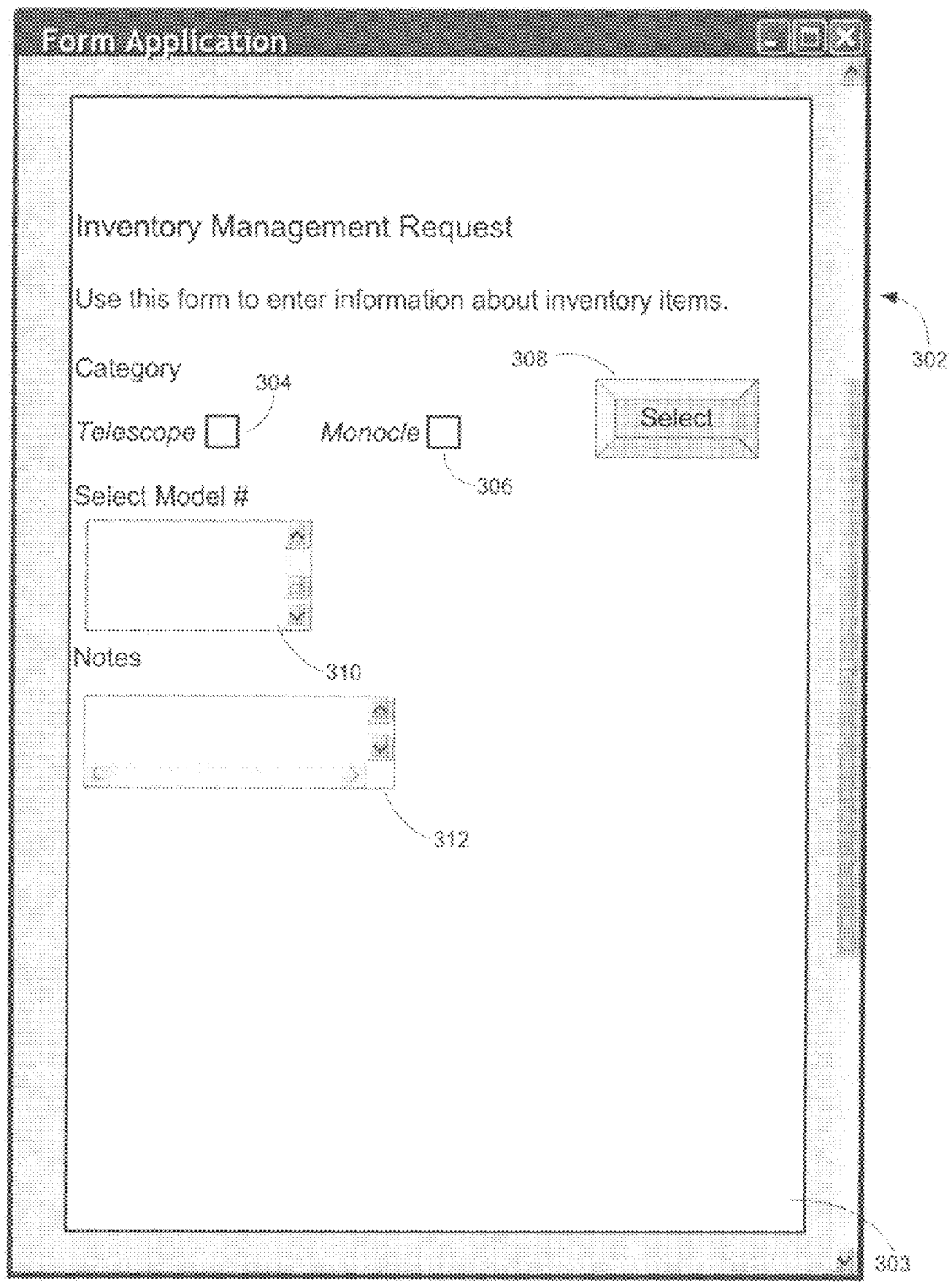
FIG. 3 illustrates a further example of a graphical user interface window as may be used by a form application to present electronic content such as, for example, an electronic document including or associated with the form template, according to an example embodiment.

FIG. 3 illustrates a further example of a graphical user interface window 302 as may be used by a form application to present electronic content such as, for example, an electronic document including or associated with the form template, according to an example embodiment.

The graphical user interface window 302 is illustrated as it may be presented by a form application, and displays a rendering of a page 303 of an example electronic document. The page 303 includes a rendering of a form template, the rendering including renderings of two check boxes 304 and 306, a select button 308, a list rendering 310, and a text area rendering 312. The electronic content and associated form template illustrated, as rendered in the graphical user interface window 302, may for example be used to enter information about inventory items.

As illustrated in FIG. 3 the electronic form rendering has not yet been manipulated by a user (e.g., via a GUI) as evidenced by the fact that the "notes" text area rendering 312 is blank, neither of the check boxes 304 or 306 are checked and the list rendering 310 is empty. For purposes of illustration, suppose that the form template, on which the rendering illustrated in FIG. 3 is based, is configured so that when a user has selected one or the other of the check boxes 304 or 306 and clicked on the select button 308, the list rendering 310 is re-rendered so as to include a list of elements rendered within it corresponding to the selected inventory category. This may be carried out, for example, by (e.g., in response to a user click event on the select button 308) accessing a file or database associated with the form template, retrieving a list of model numbers, and re-rendering the list rendering 310 so as to include renderings of the model numbers as list elements.

Figure 4:
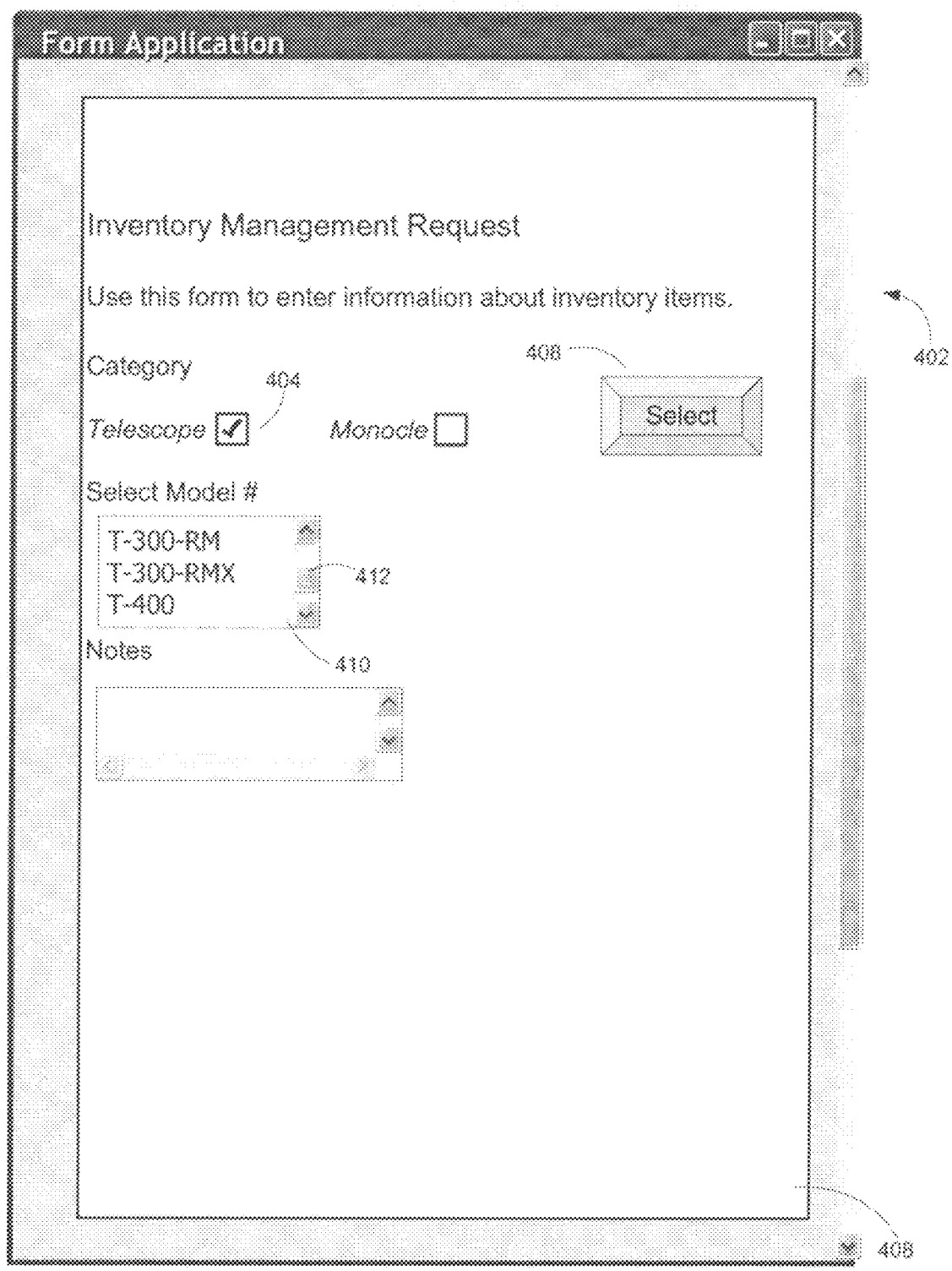
FIG. 4 illustrates the graphical user interface introduced in FIG. 3 as it may appear after the list rendering therein is re-rendered, according to an example embodiment.

FIG. 4 illustrates the graphical user interface window 302 introduced in FIG. 3 as it may appear after the list rendering 310 is re-rendered as list rendering 410, according to an example embodiment.

FIG. 4 illustrates the state of the graphical user interface window 402 as it may be rendered after a user has checked the check box 404 and clicked the select button 408. In response, to these user actions, the form application may access a list of "telescope" model numbers and re-render the list rendering 310 of FIG. 3 as list rendering 410 so as to include model number list element renderings. It will be appreciated that the linear size of the list rendering 410 has not changed and is sufficient to contain only three list element renderings regardless of the actual number of list elements to be displayed. In some embodiments, a scroll bar 412 may be used to scroll through the list to allow the re-rendering of list rendering 410 to permit a user to view and/or select all of the list elements presentable regardless of the size of the list rendering 410. Such constant-size list renderings may be presented by a form application when the list descriptor upon which the list rendering is based does not specify resizeability.

Figure 5:
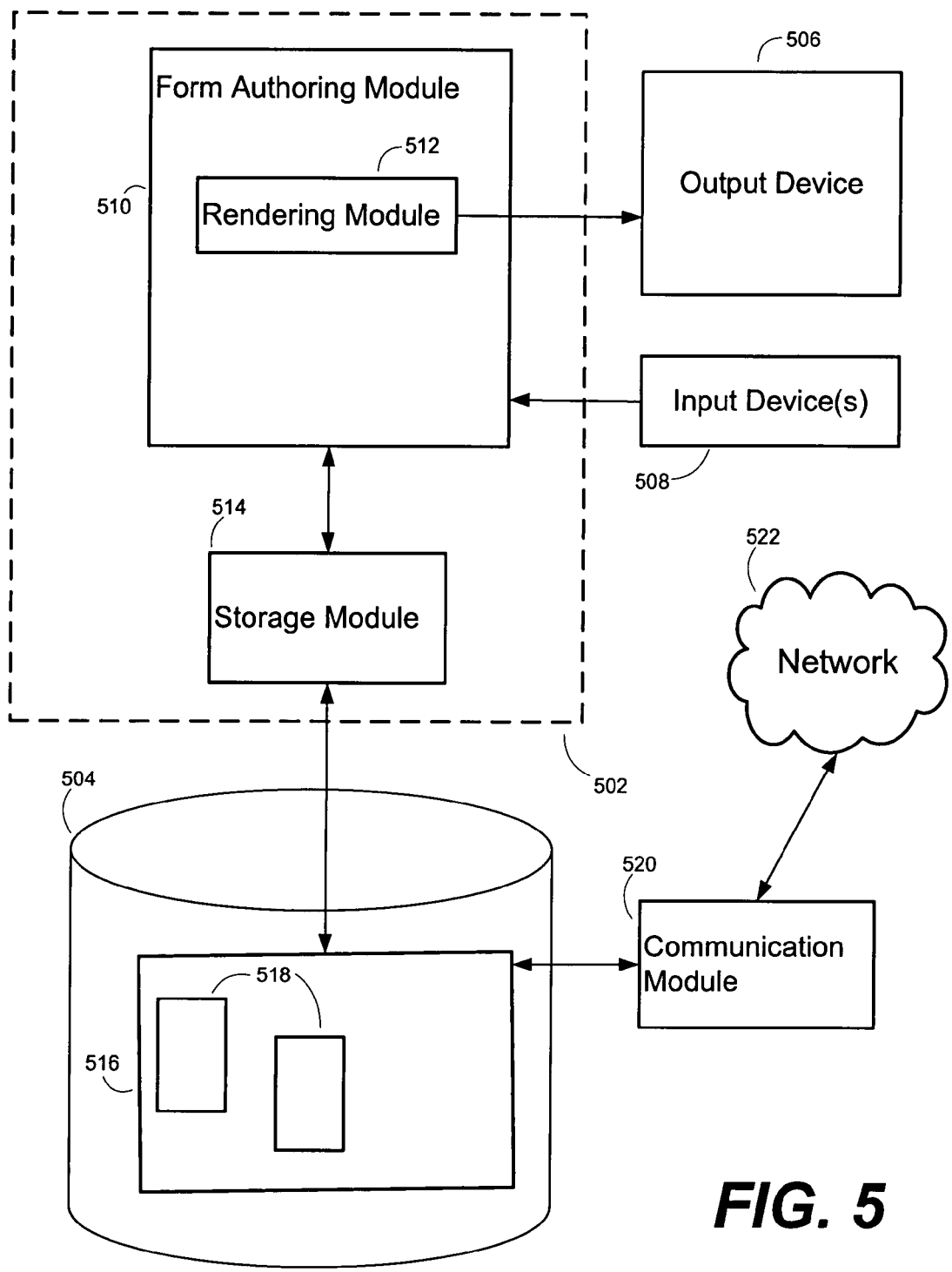
FIG. 5 illustrates a system for authoring, storing, and communicating form templates, according to an example embodiment.

Example Systems for Authoring Form Templates Including List Descriptors Declaratively Specifying Resizeability FIG. 5 illustrates a system 500 for authoring, storing, and communicating form templates, according to an example embodiment.

The system 500 may include a number of components, some of which may, in some embodiments, be included in a form authoring application 502 which may run on a form authoring machine. The components of the system 500 may include a form authoring module 510 and a storage module 514. The form authoring module 510 may be used (e.g., under by a user) to generate a list descriptor that declaratively includes a resizeability indication. The form authoring module 510 may include a rendering module 512 which may present a user with previews of a rendering of a form template being authored. In some embodiments, the rendering module 512 may be connected to an output device 506 such as, for example, a display screen. The form authoring module 510 may also be connected to one or more input devices 508 such as, for example, a mouse or a keyboard which may be used to manipulate a graphical user interface (GUI) presented by the form authoring module 510 to specify or design the form template and/or associated list descriptor(s). In some embodiments, this GUI may be presented via the rendering module 512 upon the output device 506.

The system 500 may include a storage module 514, which may be used to store an authored list descriptor(s) and/or form template(s) as a whole onto a machine-readable medium. It will be appreciated that in some embodiments the form authoring module may be a component of or otherwise used by a general purpose electronic content authoring module for authoring electronic content such as mark-up language documents, animations, electronic documents, page descriptive electronic documents, or other forms of electronic content that may include form templates and/or list descriptors. The storage module 514 may be operably connected to a data store 504, which may take the form of a computer-readable medium. The data store 504 may be used for storing form templates, list descriptors, list elements, scripts and other electronic content authored using the form authoring module 510 or other authoring tools within an electronic content authoring system. For example, the data store 504 may serve to store an electronic content 516 delivered into the data store 504 by the storage module 514. As illustrated diagrammatically in FIG. 5, the electronic content 516 may literally include or otherwise be associated with (e.g., by reference) one or more form templates 518, including list descriptors or other form elements.

In some embodiments, a form template and/or list descriptor or other containing associated electronic content may be transmitted to a remote machine. This communication process may be facilitated by a communication module 520 such as, for example, a web server or other communication software and/or hardware via a network such as, for example, the Internet or intranets as illustrated as a network 522.

Figure 6:
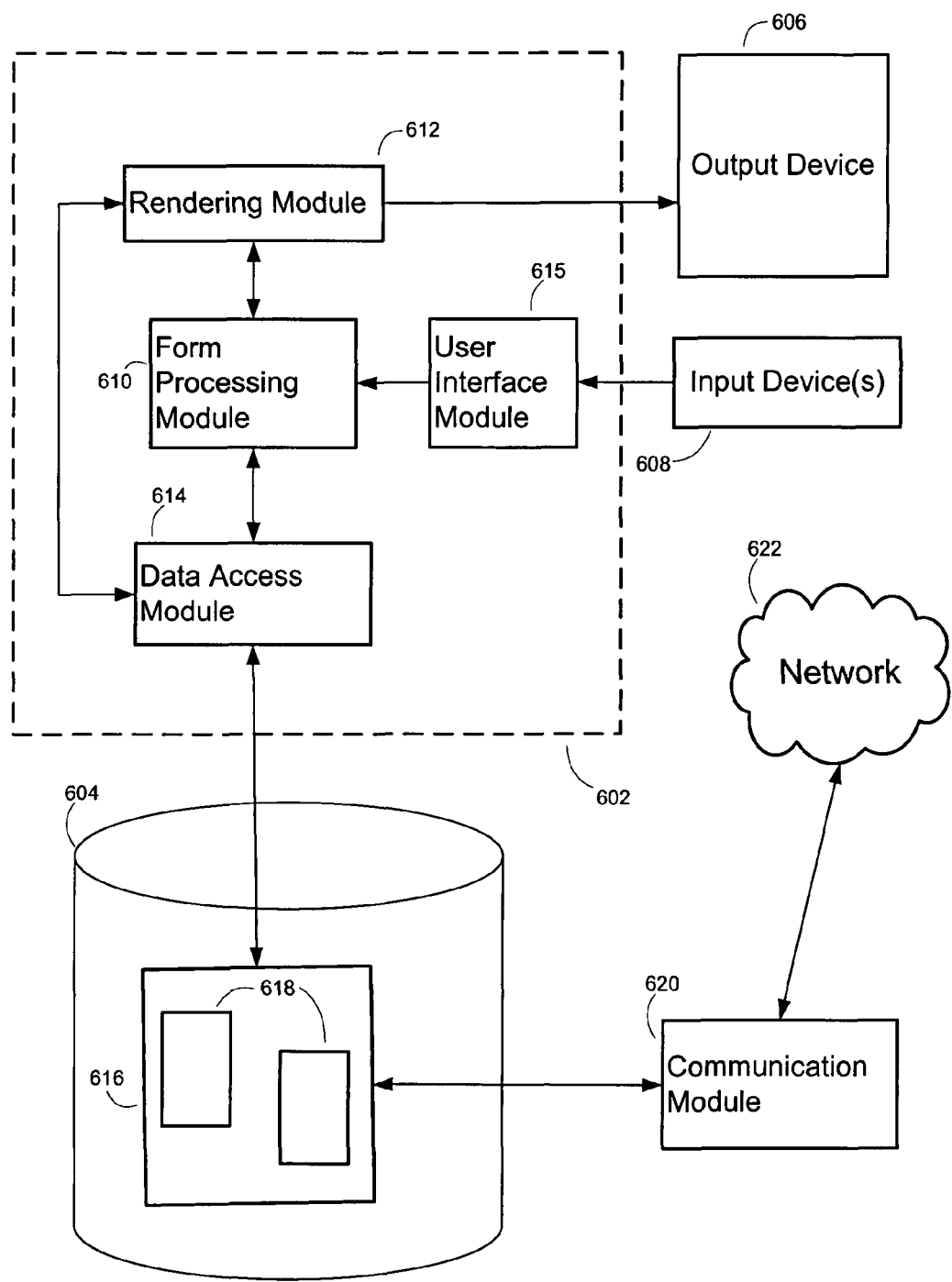
FIG. 6 illustrates a system that may be used for receiving, processing, rendering and/or receiving user input to be associated with a form template that may include a list descriptor, according to an example embodiment.

Example Systems for Presenting Form Templates Including List Descriptors Declaratively Specifying Resizeability FIG. 6 illustrates a system 600 that may be used for receiving, processing, rendering and/or receiving user input to be associated with a form template that may include a list descriptor, according to an example embodiment.

The system 600 may include a form processing module 610, a rendering module 612, a data access module 614 and a user interface module 615. In some embodiments, these modules may be part of or otherwise associated with a form presentation application that may be run on a machine implementing the system 600.

The system 600 may also include a data store 604. The data store 604 may store, for example, an electronic content 616 which may, in some embodiments, include in or otherwise associated with an electronic content. The electronic content 616 may include form templates 618. In some embodiments, the data store 604 may store list descriptors and/or form templates separately from any electronic content. The system 600 may also include a communication module 620 such as, for example, a web server or web client or other communication component which in some embodiments may be connected to a network 622 and operable for receiving form templates, list descriptors and other electronic content from a remote machine.

The data access module 614 may be used to access a form template from the data store 604 (e.g., form template 618) including a list descriptor that declaratively specifies a resizeability indication. The form processing module 610 may be used, among other functions, to select the first linear size for the list rendering based on the list descriptor. The rendering module 612 may be operably connected to an output device 606 and may, for example, be used for presenting list renderings corresponding to list descriptors.

The system 600 may also include one or more input device(s) 608 which may be used by the user interface module 615 to communicate with the form processing module 610. In some embodiments, in response to the presentation of a rendering corresponding to a list descriptor, the user may use one or more input device(s) 608 to select list elements in a list rendering within a graphical user interface (GUI) or otherwise provide input or other manipulation of data associated with form elements within a form template.

Example Data Structures and Data Formats for Electronic Forms

Figure 7:
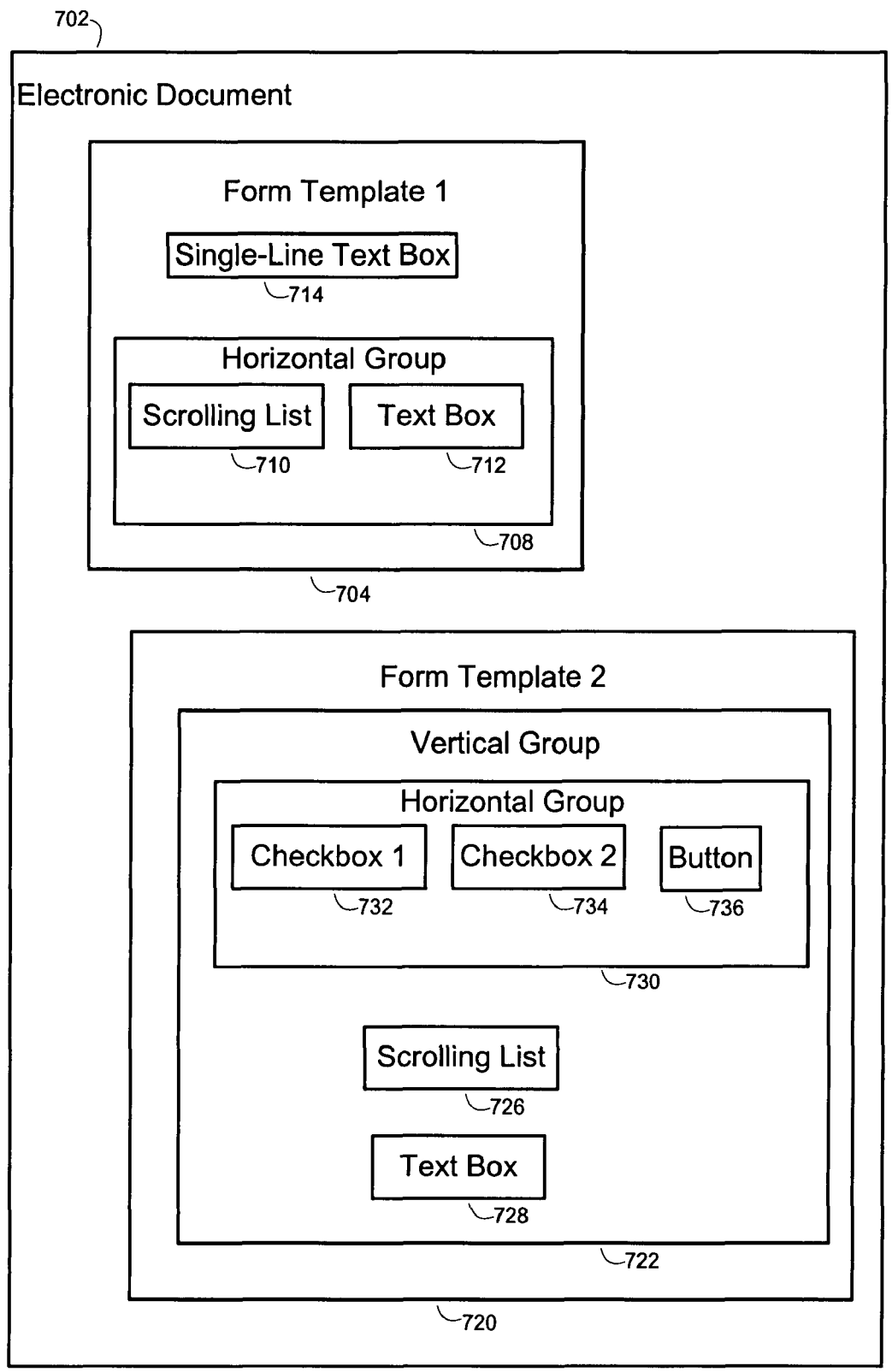
FIG. 7 is a diagrammatic representation of an electronic document including two form templates, according to an example embodiment.

FIG. 7 is a diagrammatic representation of an electronic document including two form templates, according to an example embodiment.

In FIG. 7, an electronic document or other electronic content and form templates literally included or otherwise associated with the electronic document are illustrated. The electronic document 702 is illustrated to include two form templates, form template 1 704 and form template 2 720. The form templates may describe or represent electronic form elements to be rendered within a rendering of the electronic document 702, and may also include various data items or scripts that may be used to pre-populate the form element renderings, such as by populating the list descriptive data structures with list elements. A form template may provide information to be used in storing or identifying values to be associated with the form elements (e.g., tokens), such as for example by user entry of data. Form templates may be used to group together form elements into electronic forms for inclusion in or association with electronic content, which may provide a context for the electronic forms to facilitate user understanding or for other purposes.

When a form template is being designed or authored, the various form elements may be grouped together or have their layouts or relative positions within the rendering of a form template specified by a form designer. It will be appreciated that both human users as well as automated processes may design or specify electronic forms represented by form templates.

For example, two form elements whose renderings within a graphic display based on the form template that are to be located vertically adjacent to each other may be grouped together in a vertical group. In some embodiments, such as those using the XFA form template definition format, horizontal groups may be defined by one or more note horizontal group XML tags that surround or otherwise identify further XML content describing the list objects whose renderings are to be so grouped. Horizontal and vertical groups may be nested to produce complex layouts of electronic forms.

By way of specific example, form template 1 704 may describe a form including a single line text box 714 which may be rendered similarly to the text entry box 108 of FIG. 1, as well as a horizontal group 708 including a scrolling list form element 710 which may for example be rendered similarly to the scrolling list rendering 112 of FIG. 1, and a text box element 712 which may be rendered similarly to the text entry area 110 of FIG. 1. By specifying that the scrolling list form element 710 and text box element 712 comprise a horizontal group, a for designer may specify that the renderings of the scrolling list form element 710 and the text box element 712 are to be arranged horizontally adjacent to one another to user interface display. In some embodiments, a re-rendering of one of the elements such as for example text box element 712 may be taken as an indication, such as by the form processing module 610, to request a re-rendering of the other form element to be of a similar size as described below in more detail with regard to FIG. 24.

FIG. 7 also includes a second example form template 720, including a vertical group 722. The vertical group 722 is shown for purposes of example to include a horizontal group 730, as well as a scrolling list form element 726 and a text box element 728. A horizontal group 730 may include two checkbox form elements 732 and 734 and a button form element 736. These various elements may be represented by descriptors (e.g., sections of XML data) within the file representing the form template. When a rendering of this horizontal group is produced, the resulting display may resemble the portion of the user interface represented in FIG. 3 that includes the check boxes 304 and 306 and the select button 308.

Figure 8:
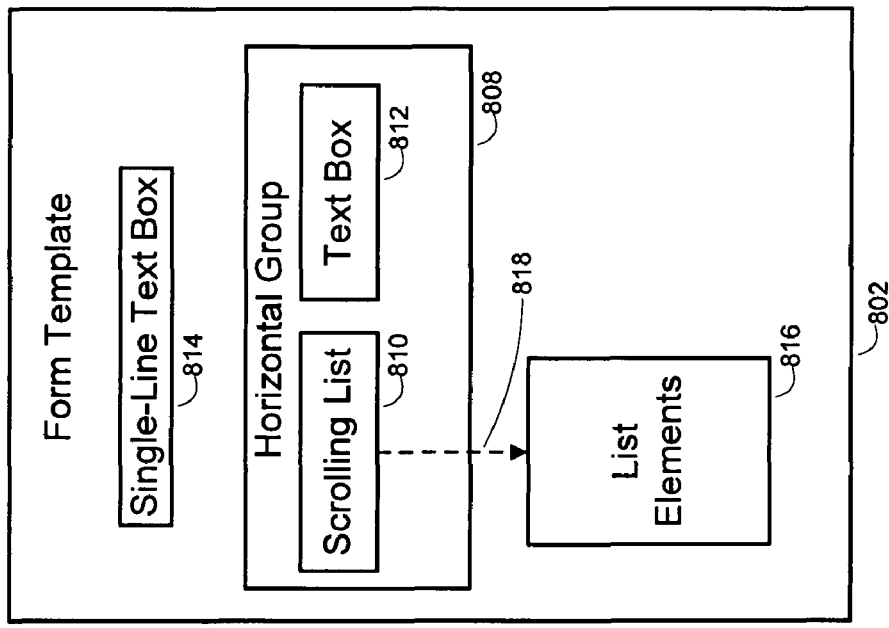
FIG. 8 and FIG. 9 diagrammatically illustrate two form template representations in which additional data is provided for populating a list rendering with list elements to be rendered within a rendering of the scrolling list, according to an example embodiment.
Figure 9:
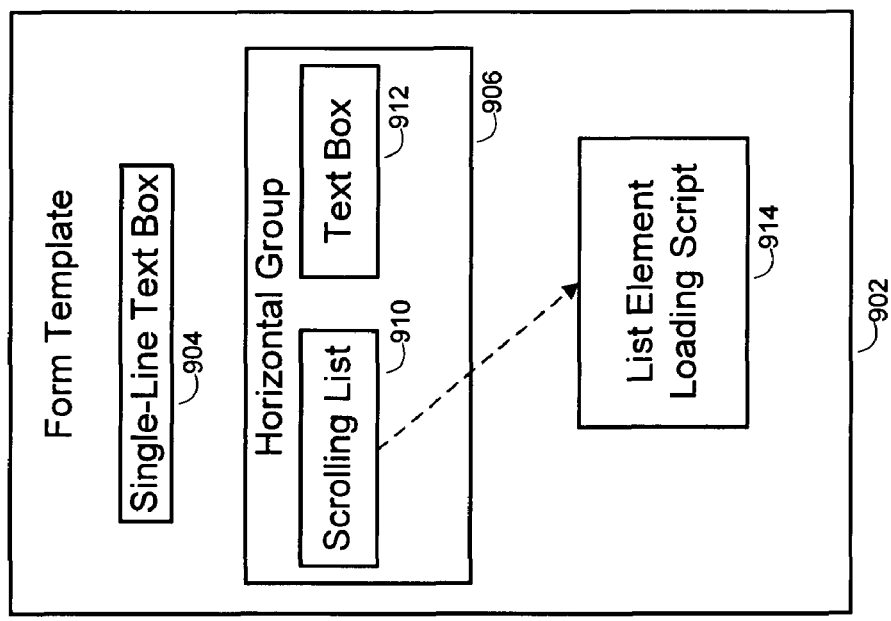

FIG. 8 and FIG. 9 diagrammatically illustrate two form template representations in which additional data is provided for populating a list rendering with list elements to be rendered within a rendering of the scrolling list, according to an example embodiment.

In FIG. 8, form template 802 is diagrammatically represented as including a number of form elements including a textbox element 812 and a list descriptor describing a scrolling list form element 810 within a horizontal group 808. In addition, the form template 802 may include data describing list elements 816 to be rendered within a list rendering of the scrolling list form element 810. The dashed line 818 indicates that the form template data, such as an XFA XML document, includes data associating the list elements 816 with the list descriptor.

FIG. 9 represents diagrammatically an example form template 902 which is similar to the form template 802 of FIG. 8. In form template 902, a list element loading script 914 may be present. The list element loading script 914 may be executed, such as for example by the form processing module 610, to load elements to be included in a list rendering corresponding to the scrolling list descriptor 910. In some embodiments, these list elements may be retrieved from a database or from some other source external to the form template 902 or files representing or containing the form template 902. In some embodiments, the scrolling list element loading script 914 may be executed in response to some user action. This event may include a user action such as a user clicking on a button element rendering, or in response to the loading of a form template XML document or processing of a form template XML document by a form processing module 610.

FIG. 10 illustrates an example data list descriptor that may be represented in an XML document representing a form template, according to an example embodiment.

FIG. 10 illustrates a portion of a form template containing an XML representation of a list descriptor, such as may be used in an XFA document. Such a list descriptor may for example, describe a scrolling or drop-down list as may be rendered so as to appear as the example list rendering 410 of FIG. 4.

A number of features may be present in a list descriptor 1002. For example, the descriptor type tag 1004 may specify that the descriptor is for a list box, such as for example scrolling list box rather than some other type of form element. The dashed boxes 1006 within a "size" tag surround an example of a resizeability indication. For example, when a "max_height" attribute's value is empty (as indicated by the empty quotation marks) rather than providing a numerical value, a form processing module (e.g., form processing module 610) may take this empty value as an indication that the size of the list as rendered may vary, e.g., in a context-sensitive manner. In some embodiments, a resizeability indication may be represented by the absence of one or more size-related attributes, e.g., "<size/>" or "<size min_height="3 inches"/>" while in some other embodiments, a maximum and a minimum size attribute may be present for a particular dimension indicating that dimension may be resizeable within the range indicated by the attribute values. In some embodiments, a lack of a fixed size indication with respect to a particular dimension may serve as a resizeability indication with respect to that dimension. For example, a list rendering may expand so that it has a linear size such as a height selected so that renderings of all the list elements contained within or associated with the list may be visible without the need of a user to scroll through the list such as by the use of a scroll bar. In addition, a list of items 1008 may be included within the list descriptor. The size of the list rendering corresponding to the list descriptor 1002 may be based on the height and/or width of the list items as they are to be rendered on the display device. In some embodiments, the values associated with the "size" tag may be specified, such as illustrated in FIG. 10, without units. In some embodiments, value that do not specify units may be taken to indicate sizes in screen pixels. In some other embodiment, a "size" tag may include unit indication(s), such as, for example, inches or centimeters.

FIG. 11 illustrates a list descriptor in which additional list items to be rendered in the list rendering are added by a script, according to an example embodiment.

FIG. 11 illustrates a list descriptor 1102 such as it may be formatted or represented using XML. It will be appreciated that the list descriptor 1102 is similar in format to the list descriptor 1002 of FIG. 10. The list descriptor 1102 may include an event flag 1104 referencing a script 1106 which may be written in JavaScript or other form of executable instructions. The execution of such instructions may cause the modification of the content of a data structure describing the list rendering based on the list descriptor 1102.

The event flag 1104 may include an event tag which may further include attributes such as the activity that triggers the event. For example, in FIG. 11 the readiness of a list rendering descriptive data structure to be rendered. A reference to data into which the event pertains (e.g., "$form" indicating the form template as a whole) to which the list descriptor 1102 pertains.

In some embodiments, a script such as script 1106 may be enclosed in or otherwise associated, such as by reference, with the "event" tag. A script may in some embodiments be identified by the script tag and may include "contentType" attribute describing the programming language or application in which the script instructions are expressed. In some embodiments in which the list descriptor includes a resizeability indication, the execution of list modifying instructions, such as for example the "addItems" instructions of script 1106 may be operable in some embodiments to allow the form processing module 610 to modify a data structure describing the list rendering so as to resize the list rendering. The "addItems" instruction may thus serve to vary the context of the list rendering, for example, the context provided by the items to be included in the list rendering. Accordingly, the form processing module 610 may cause the rendering module 612 to re-render the list rendering so as to be rendered at the new linear size or sizes.

In some embodiments, a "runAt" attribute may be present within a script 1106 to denote where the script is to be executed. In some embodiments, if a value "server" is present, the script may be executed when the electronic content e.g. 1102 is stored on a server before being downloaded by a presentation application 602, while the presence of a "client" value indicates that the script may be executed when the electronic content is presented by a presentation application 602, with a "both" value associated with the "runAt" indicating execution in both contexts.

FIG. 12 illustrates an example of a list descriptor in which a set of list elements is modified by a script in response to a user interaction with a graphical user interface button form element, according to an example embodiment.

FIG. 12 illustrates a portion 1202 of a form template represented in XML text that includes, for purposes of example, a descriptor for a button form element and a list descriptor. The list descriptor is similar to those illustrated in FIGS. 10 and 11. The list descriptor, indicated by the descriptor tag and set off by rectangle 1204, includes a "name=LB_1" attribute which may in some embodiments provide a symbolic name for the list descriptor data.

Within the descriptor for the button element as indicated by rectangle 1206, an example event response instruction set may be provided, as indicated by rectangle 1208. This event instruction set includes a script which may be executed in response to a user clicking on the graphical user interface button rendering corresponding to the button descriptor. The script illustrates and example of instructions to add items to a data structure associated with the list descriptor as indicated by the application of the "addItem" instructions to the "LB_1" name associated with the list descriptor. This relationship is indicated by the arrow 1210.

Although the example script instruction sets illustrated in FIGS. 11 and 12 are, for purposes of illustration, comparatively simple, it will be appreciated that more complex scripting or instruction sets capable of carrying out more complex programming as supported by program execution tools and languages that may be available within a form display and/or processing application.

FIGS. 13 and 14 illustrate an example of a list descriptor represented in XML to which list elements are associated or bound via retrieval from a secondary data store, according to an example embodiment.

FIG. 13 illustrates, for purposes of example, a form template 1302 including a list descriptor as it may implemented in XML. It will be appreciated that the XML representation of form template 1302 includes a list descriptor of type "list_box" and an empty "items" list 1304. The list descriptor may include a "bindItems" tag (indicated by rectangle 1306) that indicates a portion of an external data file via a wild card-type "reference" attribute as well as attributes indicating the tags identifying each list element label and token. The form template 1302 may also include a "templateDesigner" tag indicated by rectangle 1308 and including an identification of a name of a file from which list elements or other data for use in the electronic form may be retrieved. It will be appreciated that the retrieval of list elements from a secondary data store may be automatic or in response to a user action in an existing form session, such as for example as described with respect to FIG. 12.

FIG. 14 illustrates an example data file 1402 that may be used in conjunction with a list descriptor specifying a "bindItems" reference, such as that indicated by rectangle 1306. The data file 1402 is shown as it may be configured to provide data pertaining to four list elements, the first of which is indicated by rectangle 1406. In some embodiments, this first list element data may include two pieces of data: a label "T-300-RM" which may be rendered as a list element within a list rendering, and a symbolic token "t3" which may provide an abbreviated indication of a user's list selection if the user makes the selection on the graphical user interface of the label as element rendering within the list rendering. In some other embodiments, the list element data may be organized in other ways besides the label/token organization shown in FIG. 14.

The inclusion of the label "T-300-RM" within list rendering corresponding to the list descriptor of FIG. 13 may be associated, in some embodiments, by the form processing module mapping from the "ref=$data.for1.list1[*]" string to the corresponding portion of the data file 1402.

In the forgoing FIGS. 10 through 14, the various form templates, list descriptors, and other data are illustrated using XML as it may be used within an XFA format. It will be appreciated that a number of different representations for form templates, list descriptors, and other data items may in some embodiments be used; for example, HTML forms, MXML, Actionscript, or other form descriptive formats and representations may be used.

Figure 15:
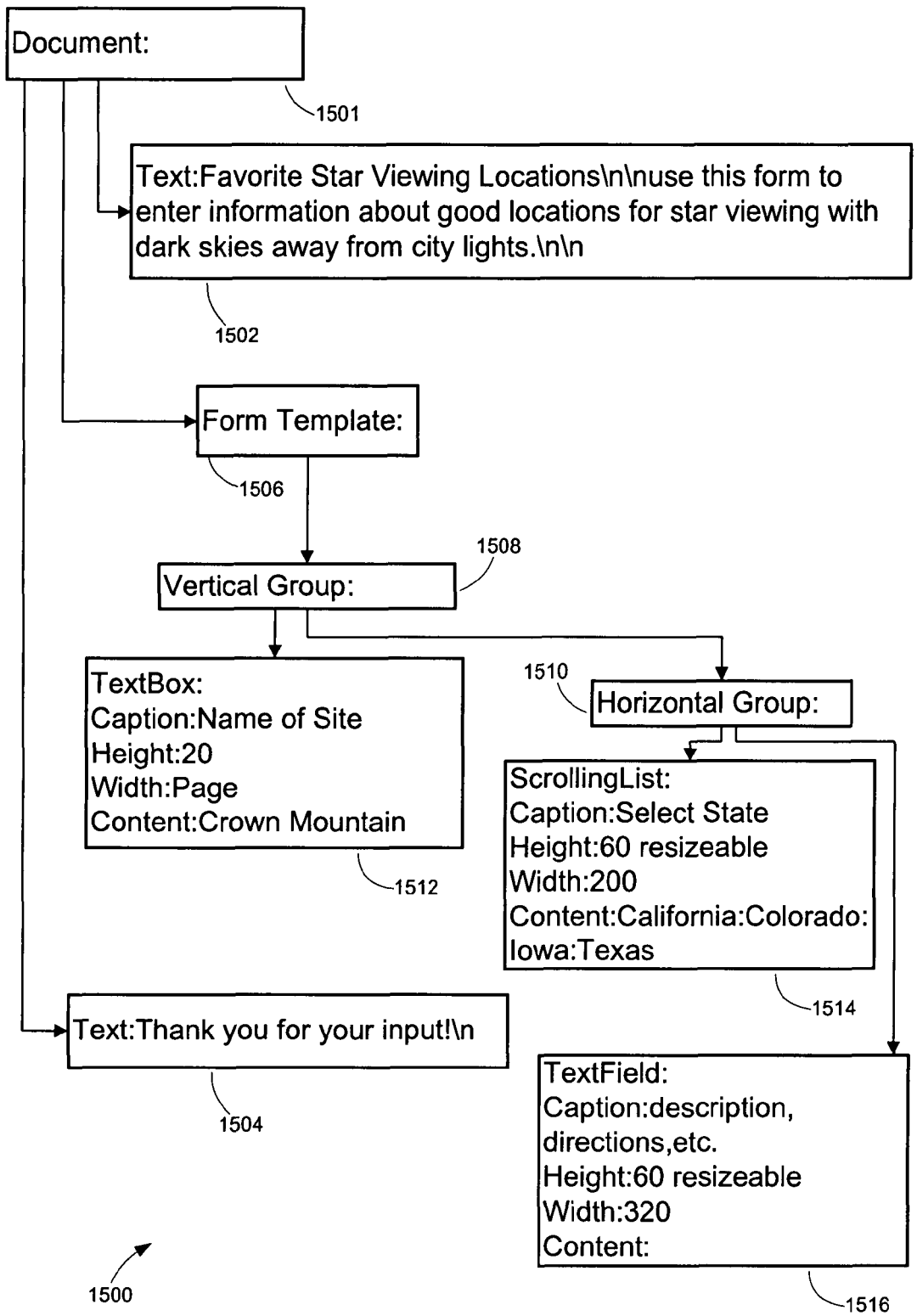
FIG. 15 is a diagrammatic illustration of an example form-containing data structure that may be maintained by an electronic content processing application or form application, according to an example embodiment.

FIG. 15 is a diagrammatic illustration of an example form-containing data structure 1500 that may be maintained by an electronic content presentation application 602 or form application, according to an example embodiment.

The data structure 1500 illustrates an example how an electronic document that includes an electronic form described by a form template may be represented within a machine so it may be accessible and modifiable by an electronic content presentation application 602. The form template illustrated in FIG. 1 may be a rendering from the data structure 1500. The data structure 1500 may be constructed in a node-and-link representation which the various content elements and components of the electronic content, such as for example an electronic document, may be rendered. In some embodiments, an electronic content 616 including one or more form templates 618 may be retrieved from a data store 604 by a data access module 614. The portions of this electronic content other than the form template may be processed by an electronic content processing and display application so as to represent the electronic content by a document root node 1501, a text node 1502, a form template node 1506, and a second text node 1504.

In the processing of the electronic content, in some embodiments, a form processing module 610 may be activated to process a form template associated with or included in the electronic content. The form processing module may then expand the data structure 1500 by adding data nodes 1508, 1510, 1512, 1514 and 1516 attached directly or indirectly to the form template node 1506. Each of the nodes 1508-1516 may store information about the form element which it describes. This information may include the type (e.g., TextBox, ScrollingList, TextField), a linear size such as, for example, a height and/or width, content of the form element, such as, for example, list element labels (and corresponding tokens) within a scrolling list descriptive node and a resizeability indication associated with the height and/or width specifying a current size to which the corresponding graphical user interface affordance is to be rendered.

In some embodiments, the rendering module 612, in the process of rendering an electronic content such as the electronic document having root node 1601, onto a display device, may carry out the rendering operation by a process that includes a depth-first type traversal of the data structure storing the electronic content. Such a traversal may include processing form-descriptive content elements as well as non-form content elements.

Figure 16:
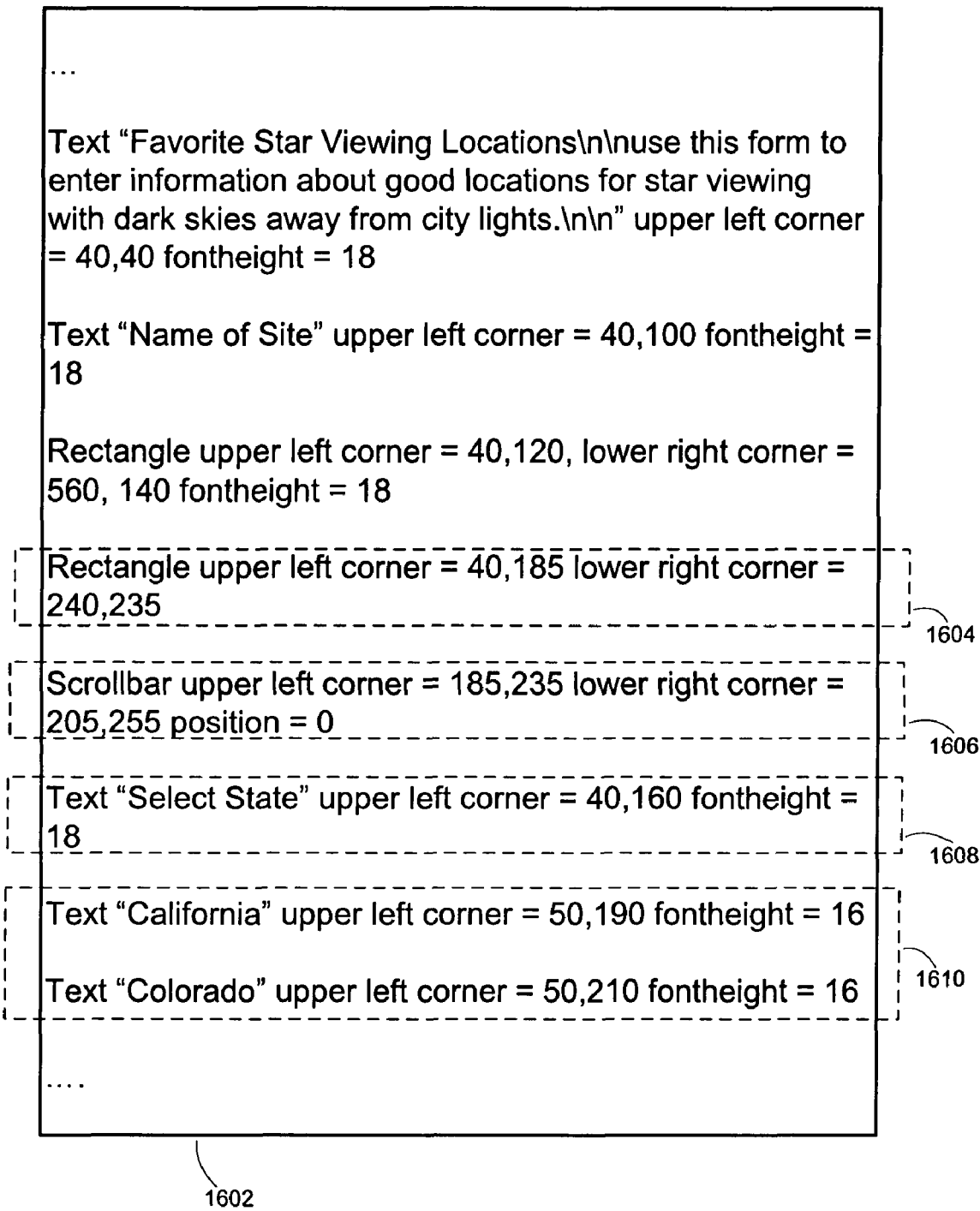
FIG. 16 illustrates a display list of a portion of an electronic document, according to an example embodiment.

FIG. 16 illustrates a display list 1602 of a portion of an electronic document, according to an example embodiment.

A display list, such as for example a display list 1602, may in some embodiments be produced by the rendering module 612 as an intermediate step in displaying an electronic content, such as for example an electronic document. The display list 1602 may include geometric and textual data describing the graphical artifacts and/or user interface affordances to be rendered on an output device, for example, output device 606.

By way of a specific example, a scrolling list rendering sized so as to contain two list element renderings and a user-manipulable scrollbar may be represented by a rectangle graphic description 1604, a scrollbar graphic description 1606, a text caption description 1608 and two list element rendering descriptions 1610. In some embodiments, a rendering module 612 may traverse the form template descriptive portion of a data structure, such as for example the sub-tree of data structure 1500 extending from form template node 1506 to produce a display list. In some other embodiments, the form processing module 610 may produce, for example through invocation by the rendering module, the various pieces of rendering description such as descriptions 1604 through 1610.

Figure 17:
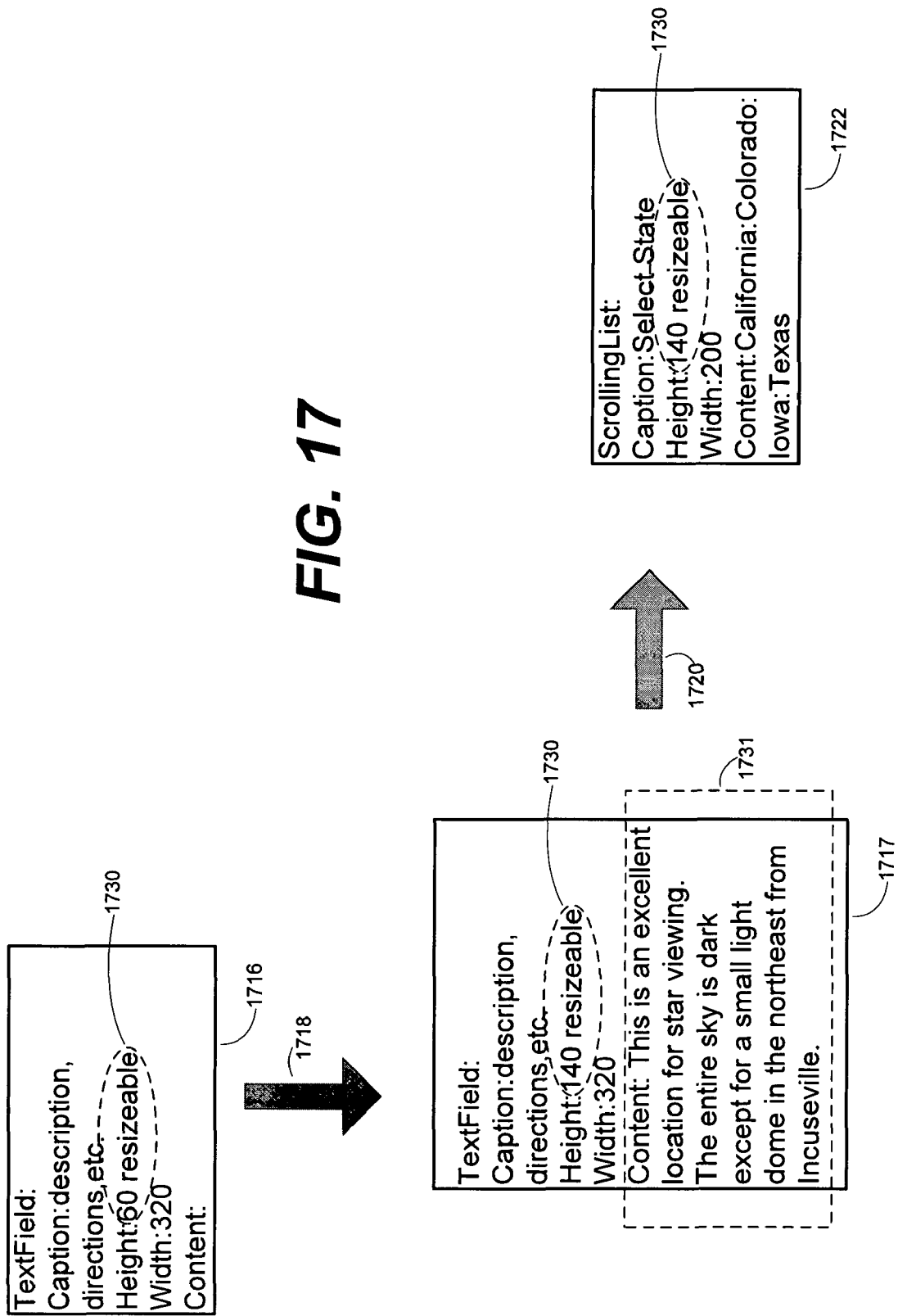
FIG. 17 illustrates diagrammatically a process for changing a linear size of a list rendering-descriptive data structure in response to a size change of a form element rendered in proximity to the list rendering, according to an example embodiment.

FIG. 17 illustrates diagrammatically a process for changing a linear size of a list rendering-descriptive data structure in response to a size change of a form element rendered in proximity to the list rendering, according to an example embodiment.

Suppose for purposes of example that an electronic document including a form template as described by the data structure 1500 of FIG. 15 is being presented to a user by an electronic content presentation application or form application. For purposes of example, suppose a scrolling list data node 1514 and a text field node 1516, by virtue of being contained conceptually by the horizontal group node 1510, are to be rendered adjacent to each other on a output device 606. Suppose further that the text field represented by text field node 1516 has no text associated with it and thus no text is displayed within the rendering of the text field, and that accordingly the text field node 1516 may be rendered in a similar aspect to the text entry area 110 of FIG. 1. Accordingly, the text field node 1516, replicated as text field node 1716 in FIG. 17, may have a height data field associated with it to indicate that the height of the text field rendering is currently 60 pixels or other units (e.g., centimeters) and that that height may be resizable based on the content to be displayed in the text field rendering. The height data field is indicated by an oval 1730.

Suppose that subsequently a user begins to enter text via a graphical user interface (GUI) into the text field rendering corresponding to the text field node 1716. During this process, the form processing module 610 or other module(s) may update the text field node so as to transform it to become text field node 1717. This updating process is indicated by the transition arrow 1718. As the user enters text via the GUI into the text field rendering, the content data field of the text field node may be updated as indicated by rectangle 1731 to contain the text that the user enters. In some embodiments, the height data field indicated by oval 1730 may also be updated to indicate that the rendering of the text field form element corresponding to the text field node 1717 has increased in size to accommodate the additional text. In response, the form processing module 610 may carry out a process represented by arrow 1720 to update the scrolling list node whose list rendering is adjacent to the list rendering of the text field node 1717. This adjacency, for example, may be by virtue of being members of the horizontal group indicated by horizontal group node 1510. Accordingly, the resized scrolling list node 1722 may have its height data field (indicated by oval 1732) updated so as to match the new height of the form element rendering of text field node 1717. In response to this resizing, a display list, such as for example of the type shown as 1602 may be prepared e.g. by the form processing module 610 or by the rendering module 612 so that the list rendering based on the scrolling list node 1722 may be re-rendered on an output device 606. In embodiments in which resizing of a list rendering is to occur in response to the resizing of one or more renderings of other form elements (e.g., a rendering of text field node 1717), an indication that a scrolling list node (e.g., 1514) is to be resized in those circumstances may be present in a form template.

Example Processes for Authoring List Descriptors

Figure 18:
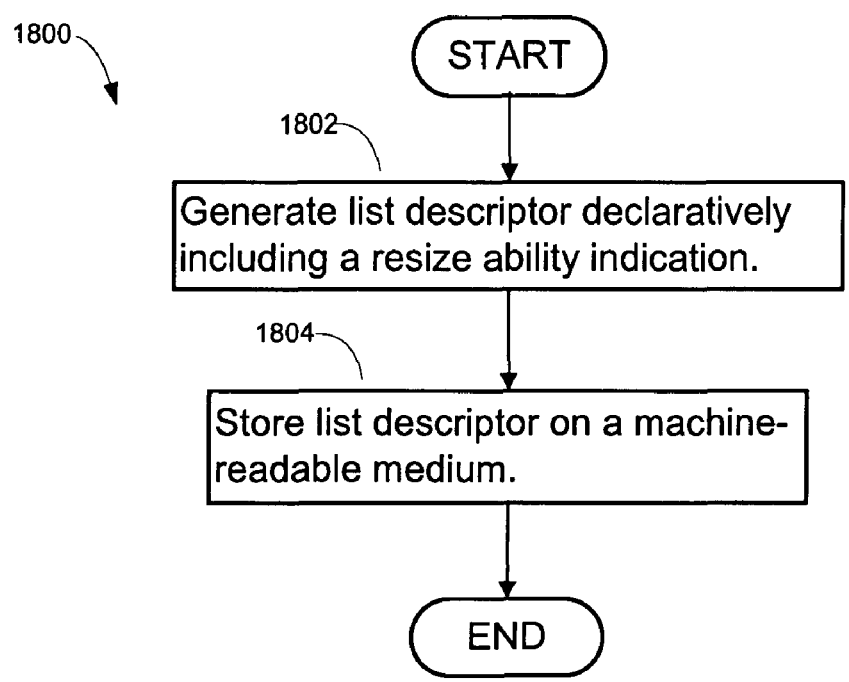
FIG. 18 illustrates a flowchart of a process for authoring list descriptors that include a declaratively specified resizeability indication, according to an example embodiment.

FIG. 18 illustrates a flowchart of a process 1800 for authoring list descriptors that include a declaratively specified resizeability indication, according to an example embodiment.

At block 1802, a list descriptor may be generated that declaratively includes a resizeability indication. This list descriptor may be generated within the context of a form template and/or within an electronic content such as, for example, an electronic document, animation or other content type. This generation may be carried out, in some embodiments, by a form authoring module 510 by the receiving of input to edit or model a list rendering to be generated from the list descriptor. Such input may be received from the input devices 508. In some embodiments, the generation of the form template may be facilitated by the use of a preview mode by which a preview rendering showing how a list rendering corresponding to the list descriptor in an intermediate state of generation or modelling by the user may appear. The preview rendering may be presented by a rendering module 512 on an output device 506. It will be appreciated that the preview rendering may, but need not, include renderings of the list elements that may be presented when the form template is presented by a presentation application 602.

At block 1804, the generated list descriptor may be stored on a machine-readable medium. In some embodiments, this storage may be carried out by a storage module 514 and the list descriptor may be stored in conjunction with, literally included in, or otherwise associated with a form template or other electronic content.

In some embodiments, the generation of a form template may include the association of executable instructions with a list descriptor to retrieve one or more list elements from a data store. Such executable instructions may be selected by a user in working with the form authoring module 510. Such executable instructions may, in some embodiments, be entered by hand, by the user, or may be automatically generated by the form authoring module 510. In some embodiments, the form authoring module may associate the list descriptor with electronic content, such as for example by a literal inclusion of the list descriptor or of a form template including or associated with the list descriptor into the electronic content.

Figure 19:
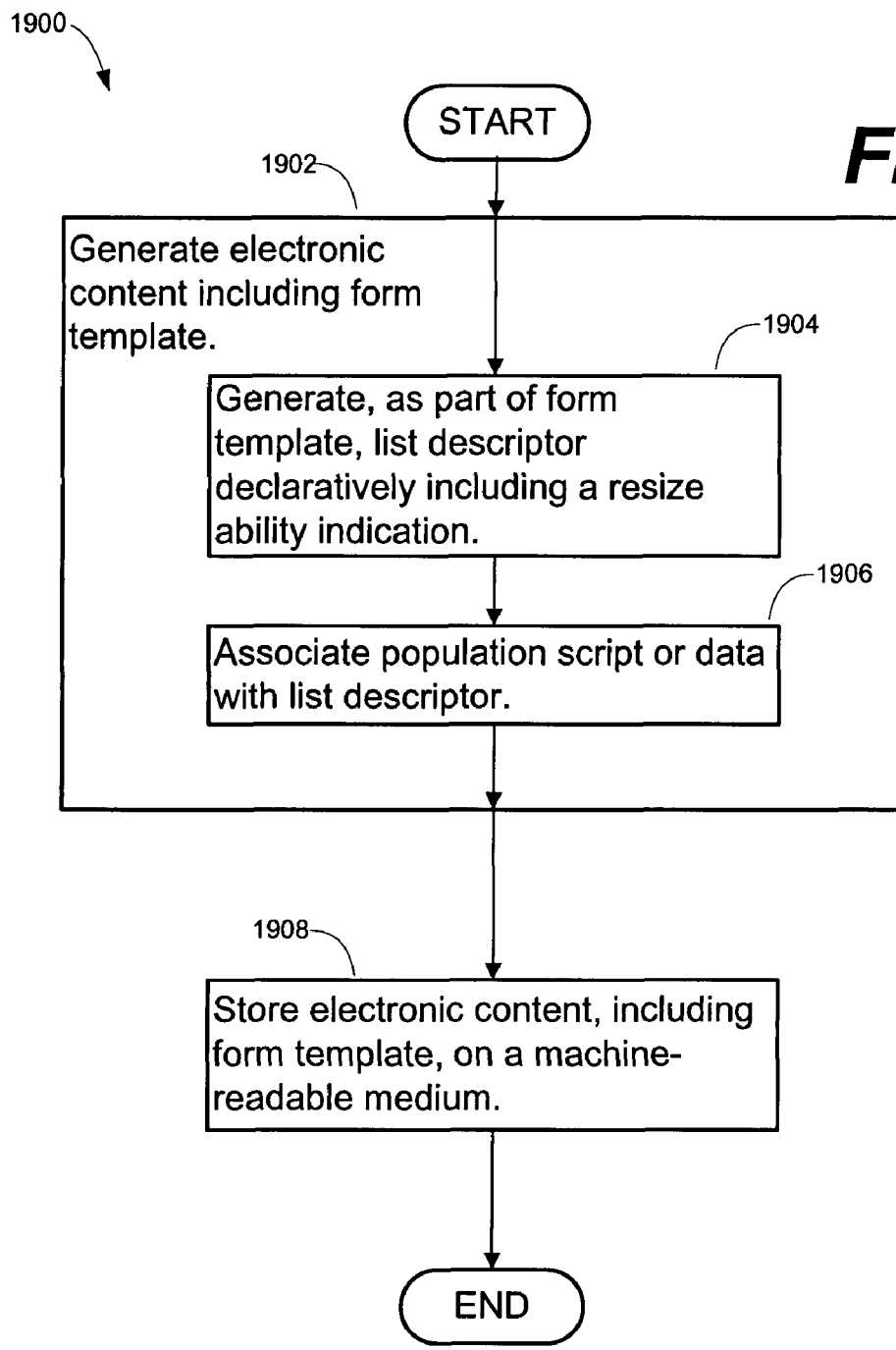
FIG. 19 is a flowchart illustrating a process for generating and storing electronic content that includes a form template, according to an example embodiment.

FIG. 19 is a flowchart illustrating a process 1900 for generating and storing electronic content that includes a form template, according to an example embodiment.

At block 1902 a user, such as by the use of the form authoring application 502 with a form authoring module 510, may generate electronic content including a form template. The processing of block 1902 may further include processing indicated by blocks 1904 and 1906. At block 1904, a user may use a form authoring module 510 to generate a list descriptor that declaratively includes a resizeability indication, such as for example as a portion of the form template included in, or to be included within, the electronic content. At block 1906, a form authoring module may associate a population script or list element data with the list descriptor, such as in response to receiving instructions or an actual script source code from the user. This population script may be used to retrieve data from a database or other resource, such as for example labels and/or tokens in a data file as illustrated in FIG. 14, to be populated into the list rendering and scrolling list data node 1514 described by the list descriptor.

Finally, at block 1908, when the electronic content generation is sufficiently progressed, the electronic content including the form template may be stored in a machine-readable medium, such as by the storage module 514 into data store 504.

Figure 20:
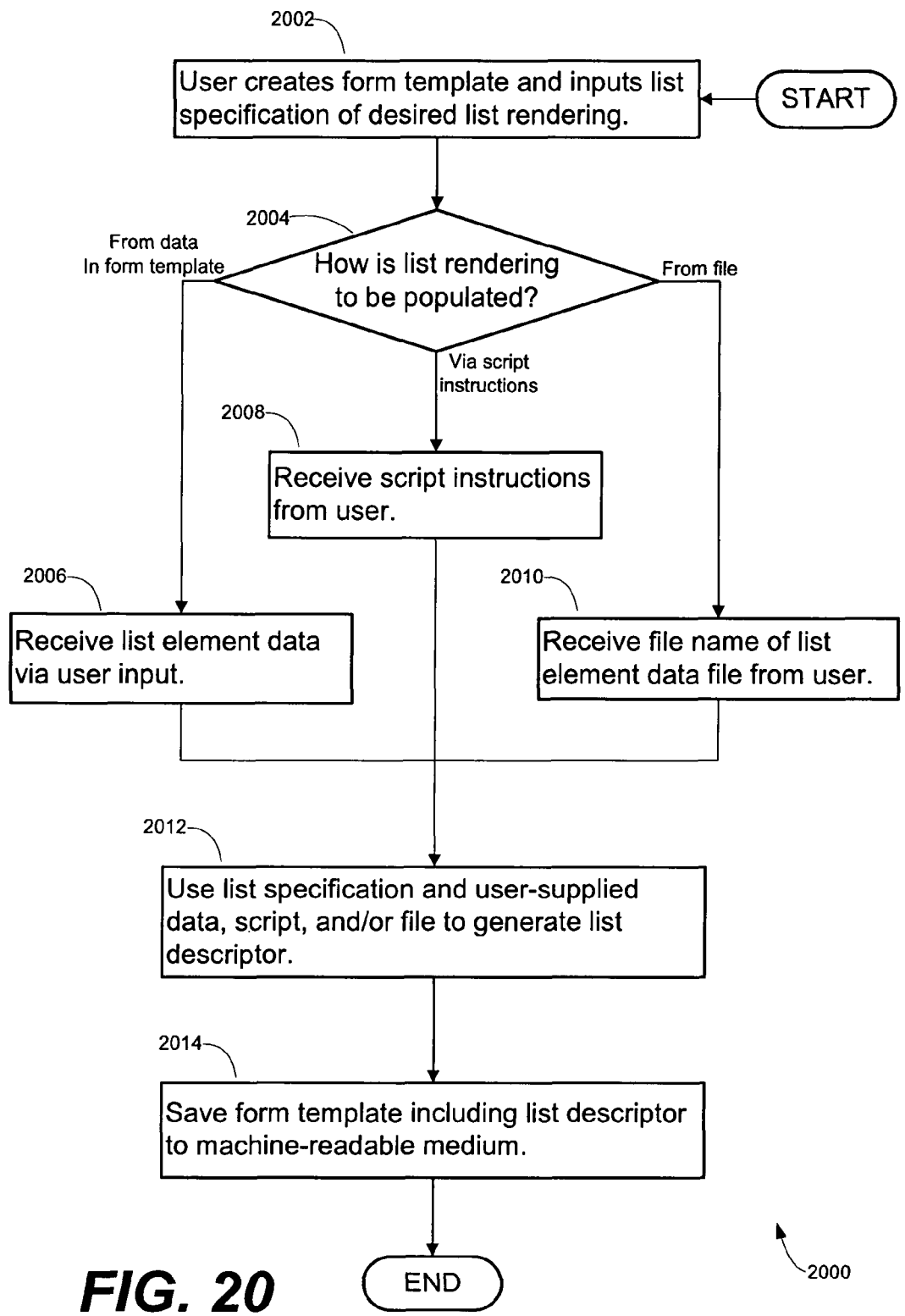
FIG. 20 is a flowchart illustrating a process for the creation of a form template including a list descriptor, according to an example embodiment.

FIG. 20 is a flowchart illustrating a process 2000 for the creation of a form template including a list descriptor, according to an example embodiment.

At block 2002 a user, such as by the use of a form authoring module 510, may create a form template and may input or otherwise enter a list specification, such as for example a textual or graphical description of the generated list rendering generable from the list specification. At decision box 2004, a determination may be made as to how the list rendering is to be populated. This determination may be based on population options, indications, and/or selections received from a user; of which three examples are presented in FIG. 20. It will be appreciated that various other population options are possible in addition to those described in this specification. If the list element data is to be stored as part of the form template with which the list descriptor is to be associated, processing may continue at block 2006 with the list element data received via user input within the template creation workflow. Alternatively, the user may wish for the list rendering to be populated from list element data retrieved via script instructions such as via a database query or some other set of executable instructions. Accordingly, processing may continue at block 2008 at which e.g., the form authoring module 510 may receive the script instructions from the user, such as by the import of a file or the creation and/or editing of the script instructions within an editing function provided by the form authoring module 510. Finally, the user may wish to have the form data, such as for example the form list elements, labels and/or tokens retrieved from a file that may be separate from the files associated with the electronic content and/or any included form template(s). In this case, the filename for the list element data file may be received from the user and the list specification data may be updated accordingly.

In any of these example list rendering population options at block 2012, the list specification and the user supplied data, script and/or file may be used by the form authoring module 510 to generate the list descriptor, such as for example, a section of a form template XML file describing the scrolling list or drop-down list to be rendered. Finally, at block 2014, the form template including or otherwise being associated with the list descriptor may be saved to a machine-readable medium, in some embodiments by the storage module 514.

Figure 21:
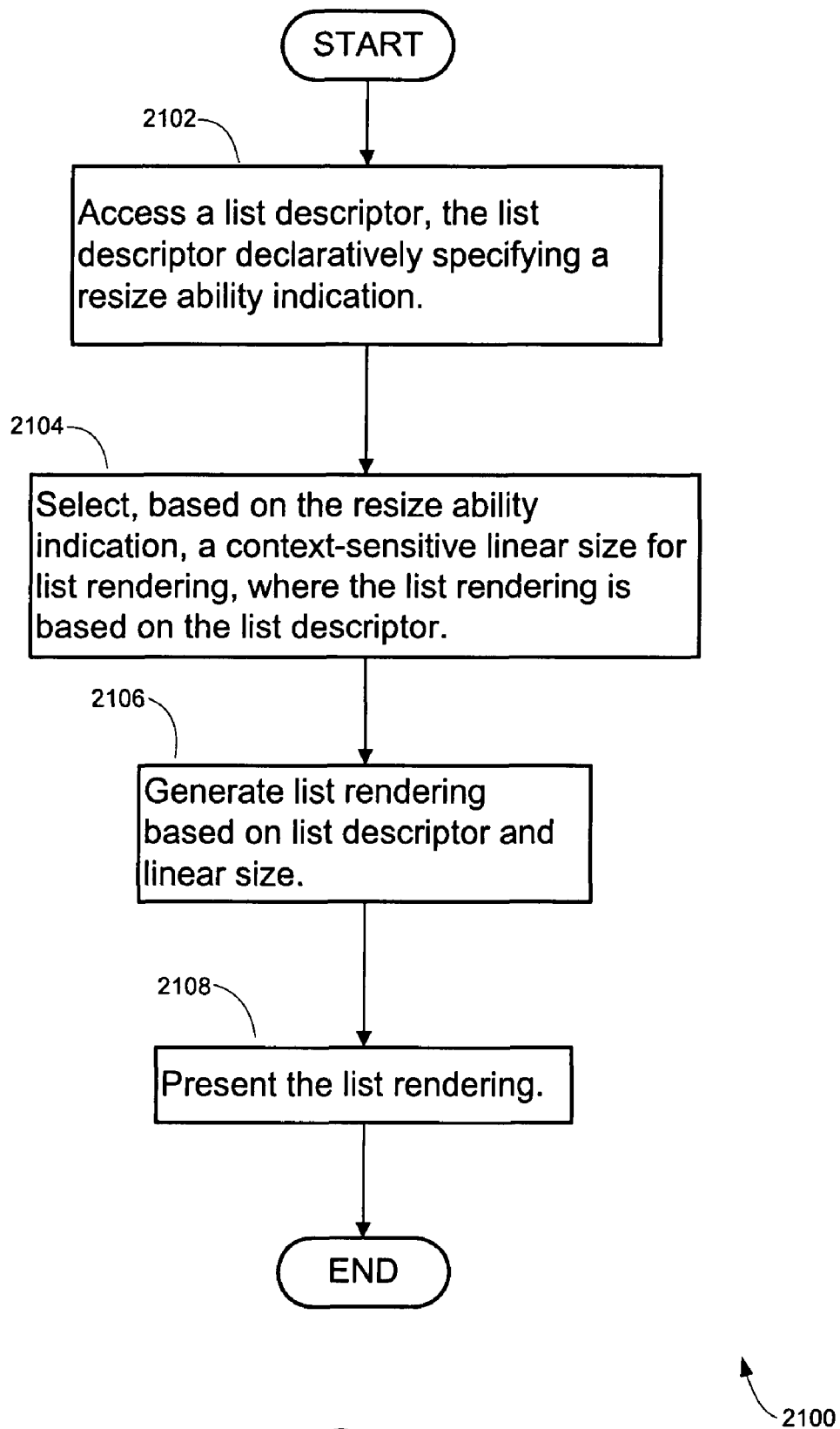
FIG. 21 is a flowchart of a process for accessing a list descriptor and presenting a list rendering based on a list descriptor, according to an example embodiment.

Example Processes for Accessing and Presenting Renderings Based on List Descriptors FIG. 21 is a flowchart of a process 2100 for accessing a list descriptor and presenting a list rendering based on a list descriptor, according to an example embodiment.

At block 2102 a list descriptor declaratively specifying a resizeability indication may be accessed, such as for example by a data access module 614. In some embodiments, a list descriptor may specify a resizeability indication by literally including a declaratively specified resizeability indication, while in some other embodiments a list descriptor may declaratively specify a resizeability indication indirectly, such as by referring to the indication or data structure including of referencing the indication. At block 2104 a linear size for the list rendering, such as, for example, a height and/or width for the list rendering based on the list descriptor may be selected responsively to the resizeability indication. This linear size may be content-sensitive insofar as it may be based not only on the list descriptor, but also on context information such as for example, the count and dimensions of renderings of list elements to be rendered within a rendering of a list based on the list descriptor, the configuration and measurements of other form elements within the form template containing the list descriptor, and other contextual information and/or analysis e.g., by a form processing module 610. In some embodiments, the selected linear size may include a width and/or a height of the rectangle to be depicted as containing list element renderings within a graphical user interface. This selection operation may in some embodiments be carried out by the form processing module 610. At block 2106 a list rendering may be generated based on at least the list descriptor and linear size is selected. This generation may be carried out in some embodiments by a rendering module 612. In some embodiments, the list rendering may be based on a data structure, such as for example of the form illustrated in FIG. 15 or by use of digest data such as displayed in FIG. 16.

Finally at block 2108, the list rendering may be presented in some embodiments by a rendering module 612.

In some embodiments, the selection of the first linear size may be based on one or more list elements to be rendered within the list rendering, such as for example by taking into account the size of the font or other characteristic by which a list element, such as an item label, is to be rendered. In some embodiments, the generation of the list rendering may include generating the list element renderings of any list elements associated with the list descriptor, or related data structures. The list rendering may be based one or more list elements, such as, for example, by including renderings of the list elements within the list rendering. In some other embodiments the list elements may be represented graphically as icons, images or other graphic images.

In some embodiments the selection of the linear size or sizes for the list rendering may be based on, or in response to an event, such as for example a graphical user interface action by a user, for example, clicking a button or otherwise manipulating an affordance within the rendering of a form template including the list rendering. The event to which the selection of the linear size may be in response may be a previous generation of a list rendering having a different, e.g., smaller, linear size.

Figure 22:
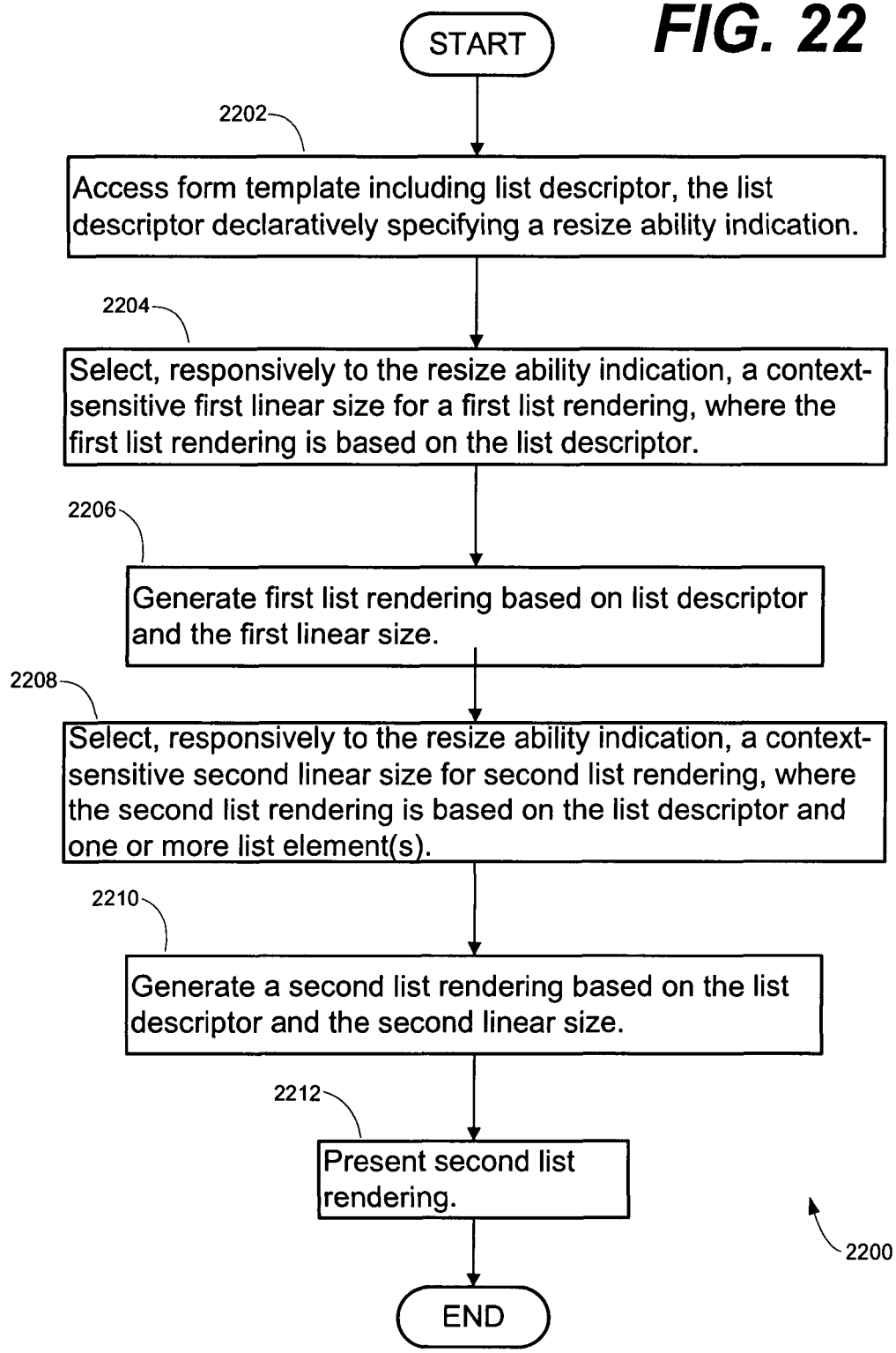
FIG. 22 is a flowchart illustrating a further process for accessing a list descriptor and presenting a list rendering based on that list descriptor, according to an example embodiment.

FIG. 22 is a flowchart illustrating a further process 2200 for accessing a list descriptor and presenting a list rendering based on that list descriptor, according to an example embodiment.

At block 2202, a list descriptor (which may be included in a form template) may be accessed, in some embodiments, by a data access module 614, where the list descriptor declaratively specifies a resizeability indication. At block 2204 a first linear size for a first list rendering where the first list rendering is based on the list descriptor may be selected responsively to the resizeability indication, in some embodiments by a form processing module 610. For example this first linear size may be a default size for a list rendering as it may be rendered without any list element renderings or list element labels within it, such as illustrated in the example list rendering 310. At block 2206, a first list rendering based on the list descriptor in the first linear size may be generated. The first list rendering may, in some embodiments, be created by a rendering module 612. In some embodiments this first rendering may actually be presented to a user, such as for example on an output device 606, while in some other embodiments this first rendering may be created before the complete processing of the form template is finished, and thus may not be immediately presented, or may not be presented before the presentation of a second list rendering.

At block 2208 a context-sensitive second linear size may be selected for a second list rendering where the second list rendering is based on the list descriptor and one or more of the list elements. The selection of the second linear size may also be carried out by the form processing module 610 and may, for example, take place in response to the execution of the script to access list elements to be rendered within the second list rendering. Alternatively, the selection may take place in response to a user action within a graphical user interface when it is rendered as is part of a form template such, as for example, a user clicking a button or checking a check box triggering the loading of list elements via a script, such as from a database or other external source. Both of these responses may be considered examples of contextual sensitivity applicable to selection of the second linear size. At block 2210 a second list rendering based on the list descriptor and the second linear size may be generated, such as in some embodiments by the rendering module 612. Finally at block 2212 the second list rendering may be presented to the user, such as the rendering module 612 or other component.

In some embodiments the retrieval of list elements, such as in response to the execution of a script associated with a form template and/or list descriptor, may be carried out by the data access module 614.

Figure 23:
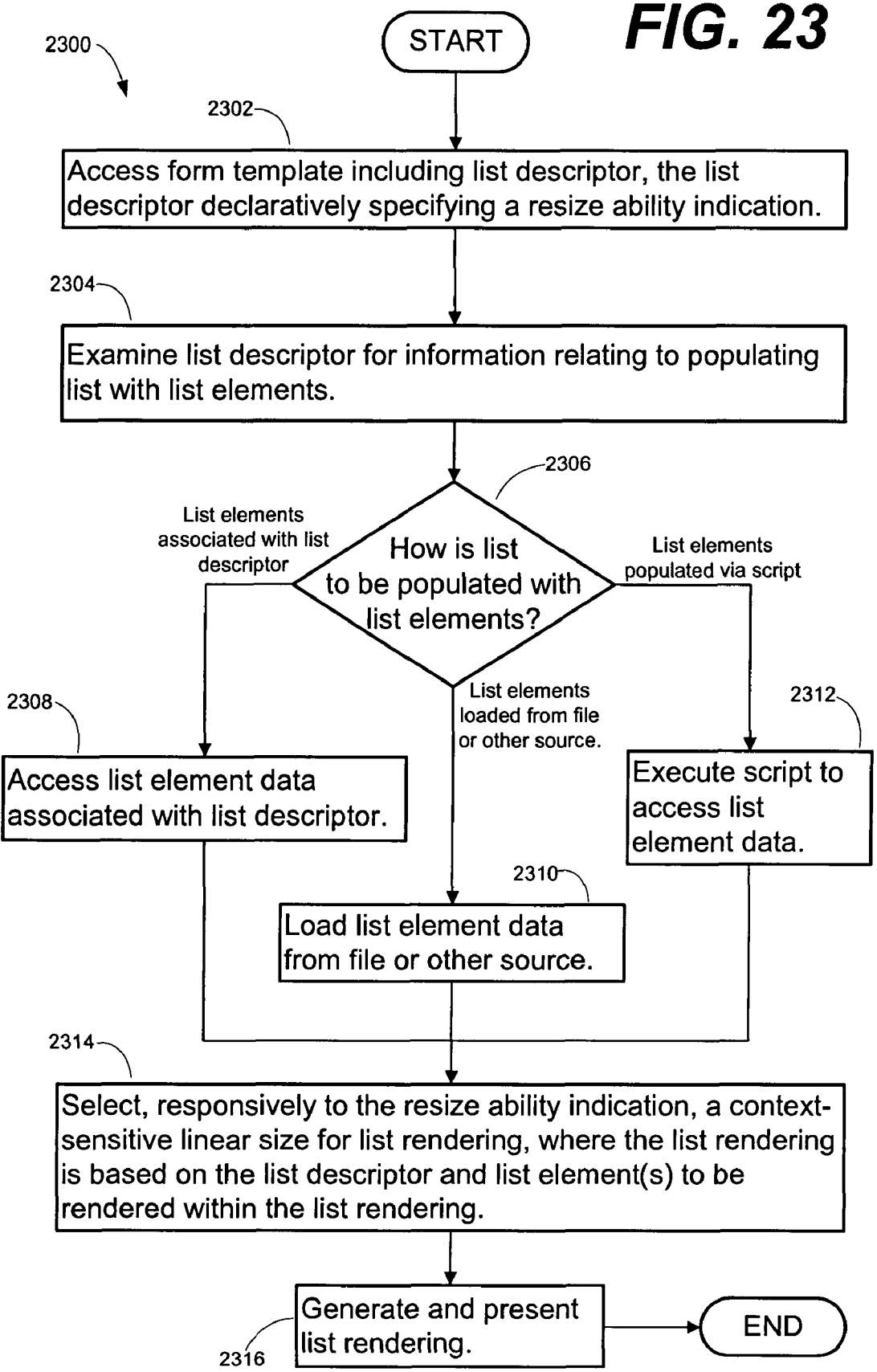
FIG. 23 illustrates a flowchart of a further process for accessing a form template and generating and presenting a list rendering, according to an example embodiment.

FIG. 23 illustrates a flowchart of a further process 2300 for accessing a form template and generating and presenting a list rendering, according to an example embodiment.

At block 2302 a form template, including a list descriptor, may be accessed, for example, by a data access module 614, where the list descriptor declaratively specifies a resizeability indication. At block 2304 a list descriptor may be examined, such as, for example, by the form processing module 610, for information such as XML tags or other data settings or flags within the representation of the list descriptor that indicate how a corresponding list data object (e.g., scrolling list data node 1514) is to be populated with list element to be rendered as list element renderings within the list rendering. At decision box 2306 a determination may be made by the list processing module, in some embodiments, as to how the list data object is to be populated with list elements. If the list elements are associated with the list descriptor such as, for example, literally included within the list descriptor representation by "item" tags as illustrated in FIG. 10, then at block 2308 the form processing module 610 may access the list element data associated with the list descriptor. If the list data object is to be populated by loading list elements from a file, processing may continue at block 2310 where, in some embodiments, the form processing modules 610 in collaboration with a data access module 614, may load list element data from a file or other (e.g., external) source and bind these list element data items, such as labels and tokens to a list data object based on the list descriptor. If the list data object is to be populated with list elements via a script, then block 2310, the script may be executed, such as, for example by the form processing module 610 or by a helper application, e.g., a programming language process and/or an interpreter, to access list element data, such as from a data base, by downloading over a network from a remote server, or by some other mechanism.

Once the list data object has been populated with list elements, such as, for example, by inserting list element data into a data structure node corresponding to the list descriptor, processing may continue at block 2314. At block 2314 one or more linear sizes for the list rendering may be selected (e.g., based on the presence of the resizeability indication), such as, for example by the form processing module 610. This linear size may be based on the list descriptor and other contextual information, such as the list elements to be rendered within that list rendering. The list elements may be represented by a list data object (e.g., 1514 of FIG. 4). Finally, at block 2316 the list rendering including the list element renderings, such as for example text labels, icons, or other list element renderings may be generated and presented. The generation and presentation of the list rendering at block 2316 may be carried out, in some embodiments, by a rendering module 612.

FIG. 24 is a flowchart illustrating a process 2400 including generating a first list rendering based on a list descriptor, generating a second list rendering based on another form element rendering having a different linear size or sizes is compared to the first list rendering, and presenting the second list rendering, according to an example embodiment.

At block 2402, a list descriptor may be accessed where the list descriptor declaratively specifies a resizeability indication. The list descriptor may be included within a form template. The list descriptor may be accessed, in some embodiments, by a data access module 614. At block 2404, a first context-sensitive linear size for a first list rendering based on the list descriptor may be selected responsively to the resizeability indication, such as by a form processing module 610. At block 2406 the first list rendering may be generated based on a list descriptor on the first linear size, such as for example by a rendering module 612. In some embodiments and/or circumstances, this first list rendering may be presented by a rendering module 612 or other module to a user At block 2408, a context-sensitive second linear size may be selected for a second list rendering. The second list rendering may be to replace the first list rendering as presented on an output device 606. The second linear size may be selected by a form processing module 610. The second linear size may be selected as being appropriate for a second list rendering, where the second list rendering is based on the list descriptor and a linear size of a rendering of another e.g., adjacent form element. The context of the selection of the second linear size may include the presence and linear size of the rendering of the other form element, and may also include an indication that a list rendering is to be resized based on another form element and/or an identification of the form elements influencing the resizing. The other element in the form may be displayed in conjunction with the first list rendering, for example, within the same vertical or horizontal group as the second list rendering. For example, if a list rendering and a rendering of some other form element are to be displayed in conjunction with one another, such as for example side by side, the second list rendering may be created in response to the resizing of the other form element rendering.

At block 2410, the second list rendering, based on the list descriptor and the second linear size, may be generated, in some embodiments, by a rendering module 612. Finally, at block 2410, the second list rendering may be presented, in some embodiments, by the rendering module 612. The of the second list rendering may replace the first list rendering on an output device 606.

Example User Interfaces Illustrating List Renderings Based on List Descriptors Declaratively Specifying a Resizeability Indication FIG. 25 illustrates an example user interface 2502 including a list rendering based on a list descriptor declaratively specifying the resizeability indication, according to example embodiment.

The graphical user interface 2502 (which may in some embodiment be presented by a form application) illustrates how an electronic document may be presented that includes a form template having various form elements. Such form elements, for example a scrolling list and a text field, may be presented as list rendering 2504 and text field rendering 2506 respectively. By comparison with user interface window 102 in FIG. 2, it will be appreciated that the list rendering 2504 has been re-rendered so that its height linear size matches that of the text field rendering 2506. In some embodiments, this re-rendering may have been carried out in response to the user's entry of a large amount of text to be associated with the text field form element rendered as text field rendering 2506. In some embodiments, this re-rendering may be facilitated by an indication which may be associated with a list descriptor or form template and/or by an identification of a form element (e.g., a text field element rendered as rendering 2506) within a form template whose rendered size is to influence the size of the list rendering 2504. As the text field rendering 2506 is (in some embodiments, continuously) re-rendered in response to the user input of text, the list rendering 2504 may be re-rendered in increasing size in conformance with the increasing size of the text field rendering 2506. It will be appreciated that because the resizeability is declaratively specified in the list descriptor from which the list rendering 2504 is derived or based, this size selection and re-rendering process may be carried out automatically by a form processing module 610 and a rendering module 612 within or associated with the form presentation and/or editing application. In some embodiments, a re-rendering of a list rendering to a larger size may be carried out when, for example, an adjacent form element rendering decreases in size, thus permitting the list rendering to be re-rendered with a larger size within a shared display space containing the list rendering and the other form element rendering.

Figure 26:
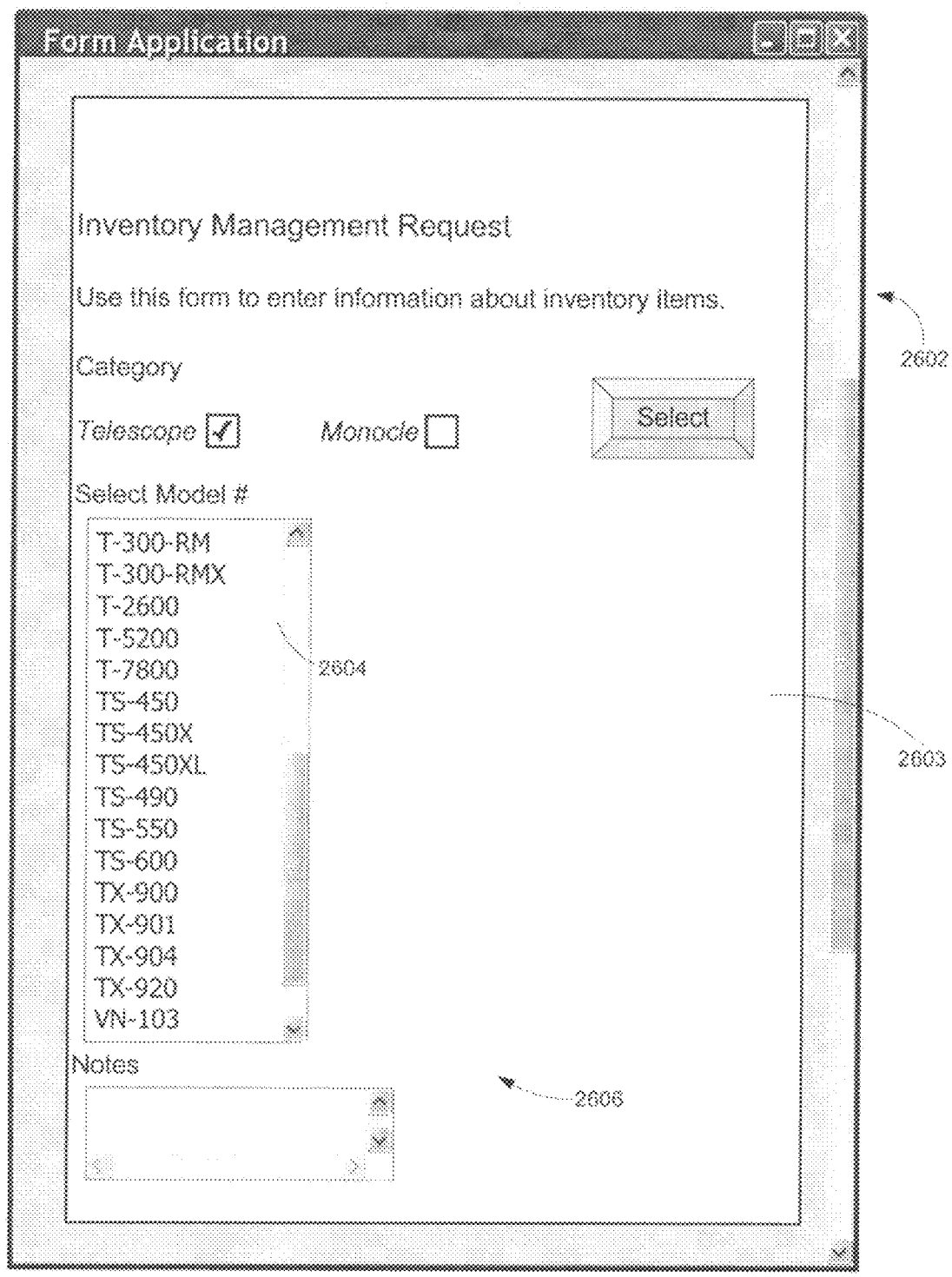
FIG. 26 illustrates a further graphical user interface including a list rendering based on a list descriptor having a declaratively specified resizeability indication, according to an example embodiment.

FIG. 26 illustrates a further graphical user interface 2602 including a list rendering based on a list descriptor having a declaratively specified resizeability indication, according to an example embodiment.

It will be appreciated that FIG. 26 corresponds to FIG. 4 after a user has selected the category "Telescope" and pressed the "Select" button, thereby causing a list of telescope model numbers to be accessed, such as from a database, and rendered as labels in a list rendering, in the case of FIG. 4, a list rendering 410. In FIG. 26 the list rendering, by contrast to the list rendering 410 of FIG. 4, is based on a list descriptor declaratively specifying a resizeability indication. Thus, when the "Telescope" checkbox is checked and the user clicks on the "Select" button, the list rendering 2604 may be re-rendered to be sufficiently large to contain the complete list of model numbers, by contrast with list rendering 410 which may not be re-rendered at the larger size due to list rendering 410 being based on a list descriptor that may not declaratively specifying a resizeability indication. It will be appreciated that the rest of the form, such as for example the "Notes" text field rendering has been re-rendered at a lower position within the rendering 2303 of the electronic document.

Although the examples of list descriptors, data structures, and user interface diagrams described and illustrated herein are in the form of scrolling lists and/or processes, data structures, systems may be applicable to drop-down lists as well as other list types. It will also be appreciated that various forms of electronic content may include form templates and/or list descriptors as described above and that list descriptors need not be included within form templates to be included within electronic content. In some embodiments, list descriptors may be stored separately from any other electronic content and list renderings may be produced separately from other electronic content or form elements.

Example Hardware and Computer Systems for Implementing Example Processes

Figure 27:
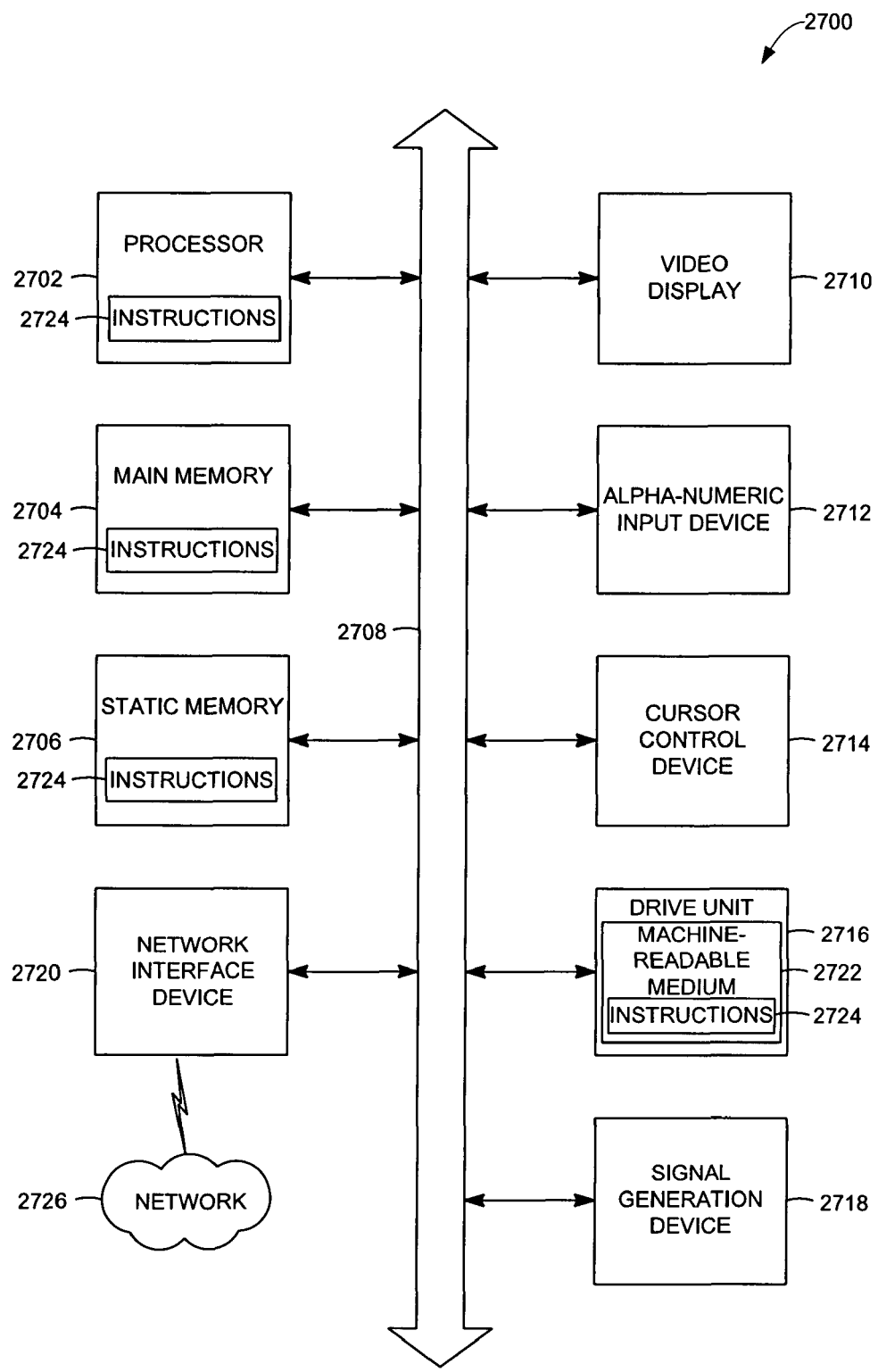
FIG. 27 shows a diagrammatic representation of machine in the example form of a computer system within which a set of instructions, for causing the machine to perform any one or more of the methodologies discussed herein, may be executed.

FIG. 27 shows a diagrammatic representation of machine in the example form of a computer system 2700 within which a set of instructions, for causing the machine to perform any one or more of the methodologies, methods, processes, or procedures discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2700 includes a processor 2702 (e.g., a central processing unit (CPU), a graphics processing unit (GPU) or both), a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alphanumeric input device 2712 (e.g., a keyboard), a user interface (UI) navigation device 2714 (e.g., a mouse), a disk drive unit 2716, a signal generation device 2718 (e.g., a speaker) and a network interface device 2720.

The disk drive unit 2716 includes a machine-readable medium 2722 on which is stored one or more sets of instructions and data structures (e.g., software 2724) embodying or utilized by any one or more of the methodologies or functions described herein. The software 2724 may also reside, completely or at least partially, within the main memory 2704 and/or within the processor 2702 during execution thereof by the computer system 2700, the main memory 2704 and the processor 2702 also constituting machine-readable media.

The software 2724 may further be transmitted or received over a network 2726 via the network interface device 2720 utilizing any one of a number of well-known transfer protocols (e.g., HTTP).

While the machine-readable medium 2722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   accessing a list descriptor declaratively specifying a resizeability indication of a list;
   selecting, responsive to the resizeability indication, a first linear size for a first list rendering of the list, the first list rendering being based on the list descriptor, the first list rendering being a form element included in a form template;
   generating the first list rendering based on the list descriptor and the first linear size, first list rendering positioned relative to another form element;
   determining a position of the other form element in the form template based on the first linear size for the first list rendering, the other form element having another linear size;
   presenting the first list rendering;
   selecting, responsive to the resizeability indication, a second linear size for a second list rendering of the list, the second list rendering being based on the list descriptor, a list element, and the other linear size of the other form element;
   generating the second list rendering as a replacement for the first list rendering, the second list rendering based on the list descriptor and the second linear size, and
   replacing the first list rendering with a presentation of the second list rendering.

2. The method of claim 1, wherein the selection of the first linear size is further based on a list element to be rendered within the first list rendering.

3. The method of claim 2, wherein the first list rendering is further based on the list element.

4. The method of claim 2, wherein the list element is associated with the list descriptor, and wherein the generation of the first list rendering comprises generation of a list element rendering of the list element.

5. The method of claim 2, wherein the list element is included in a data store, and the method further comprises:
   retrieving the list element from the data store; and
   wherein the selection of the first linear size is further based on the list element.

6. The method of claim 5, wherein the selection of the first linear size is in response to an event.

7. The method of claim 6, wherein the event is the generation of the first list rendering.

8. The method of claim 6, wherein the event is a user action.

9. The method of claim 2, further comprising executing instructions to access the list element, wherein the instructions are associated with the list descriptor.

10. The method of claim 9, wherein the list element is accessible from a data store and is stored separately from the list descriptor.

11. The method of claim 1, wherein the list descriptor is associated with electronic content and the first list rendering is included in a rendering of the electronic content.

12. The method of claim 11, wherein the electronic content includes at least one of a mark-up language document, an animation, an electronic document, page-descriptive electronic document, or combinations thereof.

13. The method of claim 11, wherein the list descriptor is literally included in the electronic content.

14. The method of claim 1, wherein the list descriptor includes an indication that the first list rendering is to be rendered as a scrolling list.

15. The method of claim 1, wherein the list descriptor includes an indication that the first list rendering is to be rendered as a drop-down list.

16. A method comprising:
    generating a list descriptor declaratively specifying a resizeability indication of a list;
    storing the list descriptor on a non-transitory machine-readable medium,
    a first linear size for a first list rendering being selectable in response to the resizeability indication, the first linear size being based on the list descriptor,
    a first list rendering being a form element included in a form template, positioned relative to another form element having another linear size and based on the list descriptor and the first linear size being generable, and
    a position of the other form element in the form template based on the first linear size for the first list rendering and the other linear size;
    presenting the first list rendering;
    selecting, responsive to the resizeability indication, a second linear size for a second list rendering of the list, the second list rendering being based on the list descriptor, a list element, and the other linear size of the other form element;

generating the second list rendering as a replacement rendering for the first list rendering, the second list rendering based on the list descriptor and the second linear size; and replacing the first list rendering the second rendering.

17. The method of claim 16, wherein the first linear size is further selectable based on a list element to be rendered within the first list rendering.

18. The method of claim 17, wherein the generation of the list descriptor includes an association of executable instructions to retrieve the list element from a data store.

19. The method of claim 16, further comprising associating the list descriptor with electronic content.

20. The method of claim 19, wherein the association of the list descriptor with the electronic content is via literal inclusion of the list descriptor within the electronic content.

21. A system comprising:
a data access module to access a list descriptor, the list descriptor declaratively specifying a resizeability indication of a list;
a form processing module to select, using one or more processors, responsively to the resizeability indication, a first linear size for a first list rendering of the list, the first list rendering being based on the list descriptor, the first list rendering being a form element included in a form template;
a rendering module to generate the first list rendering based on the list descriptor and the first linear size, the first list rendering positioned relative to another form element; and
the form processing module further to determine a position of the other form element in the form template based on the first linear size for the first list rendering, the other form element having another linear size, and to select, responsive to the resizeability indication, a second linear size for a second list rendering of the list, the second list rendering being based on the list descriptor, a list element, and the other linear size of the other form element;
the rendering module to generate the second list rendering as a replacement for the first list rendering, the second list rendering based on the list descriptor and the second linear size.

22. The system of claim 21, wherein the rendering module is to present the first list rendering.

23. The system of claim 21, wherein the selection of the first linear size by the form processing module is further based on a list element to be rendered within the first list rendering.

24. The system of claim 23, wherein the list element is associated with the list descriptor, and the rendering module is to generate a list element rendering of the list element.

25. The system of claim 23, wherein the list element is included in a data store, the data access module is to retrieve the list element from the data store, and the selection of the first linear size is further based on the list element.

26. The system of claim 23, wherein the form processing module is to execute instructions to access the list element, and the instructions are associated with the list descriptor.

27. A system comprising:
a form authoring module to, using one or more processors, generate a list descriptor, the list descriptor declaratively including a resizeability indication of a list; and
a storage module to store the list descriptor on a non-transitory machine-readable medium,
a first linear size for a first list rendering being selectable in response to the resizeability indication, the first linear size being based on the list descriptor,
a first list rendering being a form element included in a form template, positioned relative to another form element having another linear size and based on the list descriptor and the first linear size being generable, and
a position of the other form element in the form template based on the first linear size for the first list rendering and the other linear size;
the form authoring module further to select, responsive to the resizeability indication, a second linear size for a second list rendering of the list as a replacement for the first list rendering, the second list rendering being based on the list descriptor, a list element, and the other linear size of the other form element and to generate the second list rendering based on the list descriptor and the second linear size.

28. The system of claim 27, wherein the form authoring module is to associate executable instructions to retrieve a list element from a data store with the list descriptor.

29. The system of claim 27, wherein the form authoring module is to associate the list descriptor with electronic content.

30. A non-transitory machine-readable medium comprising instructions, which when implemented by one or more processors perform the operations comprising:
accessing a list descriptor declaratively specifying a resizeability indication of a list;
selecting, responsively to the resizeability indication, a first linear size for a first list rendering of the list, the first list rendering being based on the list descriptor, the first list rendering being a form element included in a form template;
generating the first list rendering based on the list descriptor and the first linear size, the first list rendering positioned relative to another form element;
determining a position of the other form element in the form template based on the first linear size for the first list rendering, the other form element having another linear size;
presenting the first list rendering;
selecting, responsive to the resizeability indication, a second linear size for a second list rendering of the list as a replacement for the first list rendering, the second list rendering being based on the list descriptor, a list element, and the other linear size of the other form element; and
generating the second list rendering based on the list descriptor and the second linear size.

31. The machine-readable medium of claim 30, wherein the selection of the first linear size is further based on a list element to be rendered within the first list rendering.

32. A non-transitory machine-readable medium comprising instructions, which when implemented by one or more processors perform operations comprising:
generating a list descriptor declaratively specifying a resizeability indication of a list; and
storing the list descriptor on a non-transitory machine-readable medium,
a first linear size for a first list rendering being selectable in response to the resizeability indication, the first linear size being based on the list descriptor,
a first list rendering being a form element included in a form template, positioned relative to another form element having another linear size and based on the list descriptor and the first linear size being generable, and
a position of the other form element in the form template based on the first linear size for the first list rendering and the other linear size;

presenting the first list rendering;

selecting, responsive to the resizeability indication, a second linear size for a second list rendering of the list as a replacement for the first list rendering, the second list rendering being based on the list descriptor, a list element, and the other linear size of the other form element; and generating the second list rendering based on the list descriptor and the second linear size;

replacing the first list rendering with the second list rendering.

33. The machine-readable medium of claim 32, comprising further instructions, which when implemented by the one or more processors perform the following operation: generating the list descriptor so as to associate executable instructions to retrieve the list element from a data store.

34. A system comprising:

first means for accessing a list descriptor declaratively specifying a resizeability indication of a list;

second means for selecting, responsively to the resizeability indication, a first linear size for a first list rendering of the list, the first list rendering being based on the list descriptor, the first list rendering being a form element included in a form template;

third means for generating the first list rendering based on the list descriptor and the first linear size, the first list rendering positioned relative to another form element; and fourth means for determining a position of the other form element in the form template based on the first linear size for the first list rendering, the other form element having another linear size;

the second means further for selecting, responsive to the resizeability indication, a second linear size for a second list rendering of the list, the second list rendering being based on the list descriptor, a list element, and the other linear size of the other form element;

the third means further for generating the second list rendering based on the list descriptor and the second linear size; and fifth means for transmitting the second list rendering as a replacement for the first list rendering.

35. The system of claim 34, further comprising fifth means for presenting the first list rendering.

36. A system comprising:

first means for generating a list descriptor declaratively specifying a resizeability indication of a list; and second means for storing the list descriptor on a non transitory machine-readable medium, a first linear size for a first list rendering being selectable in response to the resizeability indication, the first linear size being based on the list descriptor, a first list rendering being a form element included in a form template, positioned relative to another form element having another linear size and based on the list descriptor and the first linear size being generable, and a position of the other form element in the form template based on the first linear size for the first list rendering and the other linear size;

third means for selecting, responsive to the resizeability indication, a second linear size for a second list rendering of the list, the second list rendering being a replacement for the first list rendering and based on the list descriptor, a list element, and the other linear size of the other form element; and fourth means for generating the second list rendering based on the list descriptor and the second linear size.

* * * * *

UNITED STATES PATENT AND TRADEMARK OFFICE
CERTIFICATE OF CORRECTION

| | | |
|---|---|---|
| PATENT NO. | : 8,413,070 B1 | Page 1 of 1 |
| APPLICATION NO. | : 11/800894 | |
| DATED | : April 2, 2013 | |
| INVENTOR(S) | : Castrucci et al. | |

It is certified that error appears in the above-identified patent and that said Letters Patent is hereby corrected as shown below:

In the Claims:

In column 23, line 56, in claim 1, before "first", insert --the--, therefor

In column 25, line 5, in claim 16, delete "the second" and insert --with the second list--, therefor In column 28, line 14-15, in claim 36, delete "non transitory" and insert --non-transitory--, therefor Signed and Sealed this
Eighteenth Day of June, 2013

Teresa Stanek Rea
*Acting Director of the United States Patent and Trademark Office*